United States Patent
Kwon et al.

(10) Patent No.: US 9,918,002 B2
(45) Date of Patent: Mar. 13, 2018

(54) MOBILE TERMINAL AND CONTROLLING METHOD THEREOF

(71) Applicant: LG ELECTRONICS INC., Seoul (KR)

(72) Inventors: Yunmi Kwon, Seoul (KR); Kiseon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/963,058

(22) Filed: Dec. 8, 2015

(65) Prior Publication Data

US 2016/0360087 A1 Dec. 8, 2016

(30) Foreign Application Priority Data

Jun. 2, 2015 (KR) .................. 10-2015-0077770

(51) Int. Cl.
*H04N 5/232* (2006.01)
*B64C 39/02* (2006.01)
(Continued)

(52) U.S. Cl.
CPC ....... *H04N 5/23206* (2013.01); *B64C 39/024* (2013.01); *B64D 47/08* (2013.01); *G05D 1/0016* (2013.01); *G05D 1/0094* (2013.01); *G06F 3/017* (2013.01); *G06F 3/0482* (2013.01); *G06F 3/0488* (2013.01); *G06F 3/04842* (2013.01); *H04N 5/23203* (2013.01);
(Continued)

(58) Field of Classification Search
CPC ........... H04N 5/23206; H04N 5/23216; H04N 5/23293; G06F 3/0482; G06F 3/017; G06F 3/0488; G06F 3/04842; B64D 47/08; B64C 39/024; B64C 2201/146; B64C 2201/127
See application file for complete search history.

(56) References Cited

U.S. PATENT DOCUMENTS 9,164,506 B1\* 10/2015 Zang .................... G05D 1/0038
9,367,067 B2\* 6/2016 Gilmore ................ G05D 1/101
(Continued)

FOREIGN PATENT DOCUMENTS

JP 2013-139256 7/2013
JP 2104-086799 5/2014
(Continued)

OTHER PUBLICATIONS

European Patent Office Application Serial No. 15003368.6, Search Report dated Sep. 27, 2016, 7 pages.
(Continued)

*Primary Examiner* — Timothy J Henn
(74) *Attorney, Agent, or Firm* — Lee, Hong, Degerman, Kang & Waimey

(57) ABSTRACT

A mobile terminal and controlling method thereof are disclosed, by which a flying object equipped with a camera can be remotely controlled. The present disclosure includes a wireless communication unit configured to perform a communication with a flying object, a touchscreen configured to output a preview image received from the flying object, and a controller outputting a shot mode list on the preview image, the controller, if at least one shot mode is selected from the shot mode list, remotely controlling a flight location of the flying object in accordance with the selected at least one shot mode.

18 Claims, 29 Drawing Sheets

(51) Int. Cl.
*B64D 47/08* (2006.01)
*G05D 1/00* (2006.01)
*G06F 3/01* (2006.01)
*G06F 3/048* (2013.01)
*G06F 3/0482* (2013.01)
*G06F 3/0484* (2013.01)
*G06F 3/0488* (2013.01)

(52) U.S. Cl.
CPC ..... *H04N 5/23216* (2013.01); *H04N 5/23229* (2013.01); *H04N 5/23245* (2013.01); *H04N 5/23293* (2013.01); *B64C 2201/127* (2013.01); *B64C 2201/146* (2013.01)

(56) References Cited

U.S. PATENT DOCUMENTS

| | | | |
|---|---|---|---|
| 2004/0201699 A1 | 10/2004 | Parulski et al. | |
| 2006/0103751 A1* | 5/2006 | Lee | H04N 5/23293 348/333.02 |
| 2008/0204402 A1 | 8/2008 | Hirata et al. | |
| 2009/0059054 A1 | 3/2009 | Oishi et al. | |
| 2009/0295976 A1* | 12/2009 | Choi | H04N 5/23293 348/333.11 |
| 2011/0103644 A1 | 5/2011 | Garten | |
| 2012/0011456 A1* | 1/2012 | Noda | G03B 17/40 715/769 |
| 2012/0113216 A1 | 5/2012 | Seen et al. | |
| 2012/0287274 A1* | 11/2012 | Bevirt | H04N 7/185 348/144 |
| 2012/0307042 A1 | 12/2012 | Lee et al. | |
| 2012/0316680 A1 | 12/2012 | Olivier, III et al. | |
| 2012/0316913 A1 | 12/2012 | Reyes | |
| 2013/0173088 A1* | 7/2013 | Callou | B64C 39/024 701/2 |
| 2013/0176423 A1 | 7/2013 | Rischmuller et al. | |
| 2013/0248648 A1 | 9/2013 | Lesperance et al. | |
| 2013/0335587 A1* | 12/2013 | Takatsuka | H04N 5/23219 348/211.4 |
| 2014/0199041 A1 | 7/2014 | Blanco et al. | |
| 2014/0204244 A1 | 7/2014 | Choi et al. | |
| 2014/0313332 A1 | 10/2014 | Sabe et al. | |
| 2014/0365929 A1* | 12/2014 | Ding | G06F 3/0488 715/765 |
| 2015/0103002 A1 | 4/2015 | Yoon et al. | |
| 2015/0120094 A1 | 4/2015 | Kimchi et al. | |
| 2015/0124109 A1* | 5/2015 | Kryeziu | H04N 5/23206 348/211.3 |
| 2015/0134143 A1* | 5/2015 | Willenborg | G05D 1/0094 701/2 |
| 2015/0142213 A1* | 5/2015 | Wang | B64C 19/00 701/2 |
| 2015/0207961 A1* | 7/2015 | Gavney, Jr. | G06K 9/3275 348/169 |
| 2015/0253970 A1* | 9/2015 | Cheng | G06T 5/00 715/765 |
| 2015/0316927 A1* | 11/2015 | Kim | G03B 15/006 701/2 |
| 2015/0370250 A1* | 12/2015 | Bachrach | G05D 1/0016 701/2 |
| 2016/0139596 A1* | 5/2016 | Na | B64C 39/024 701/2 |
| 2016/0194079 A1* | 7/2016 | Montreuil | B64C 39/024 701/2 |
| 2016/0207637 A1* | 7/2016 | Campillo | B64C 39/024 |
| 2016/0266579 A1* | 9/2016 | Chen | G05D 1/0038 |
| 2016/0313732 A1* | 10/2016 | Seydoux | G02B 27/0172 |
| 2016/0327950 A1* | 11/2016 | Bachrach | G05D 1/0016 |

FOREIGN PATENT DOCUMENTS

| | | |
|---|---|---|
| JP | 2014-212479 | 11/2014 |
| KR | 10-2014-0147462 | 12/2014 |

OTHER PUBLICATIONS

European Patent Office Application No. 15003368.6, Search Report dated Feb. 2, 2017, 19 pages.

* cited by examiner

FIG. 3
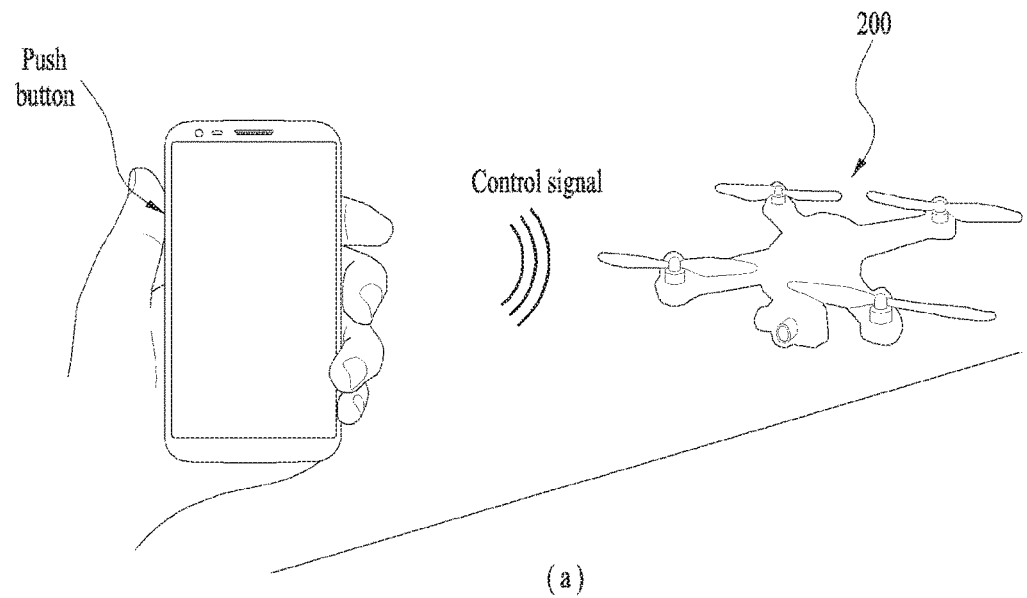
(a)
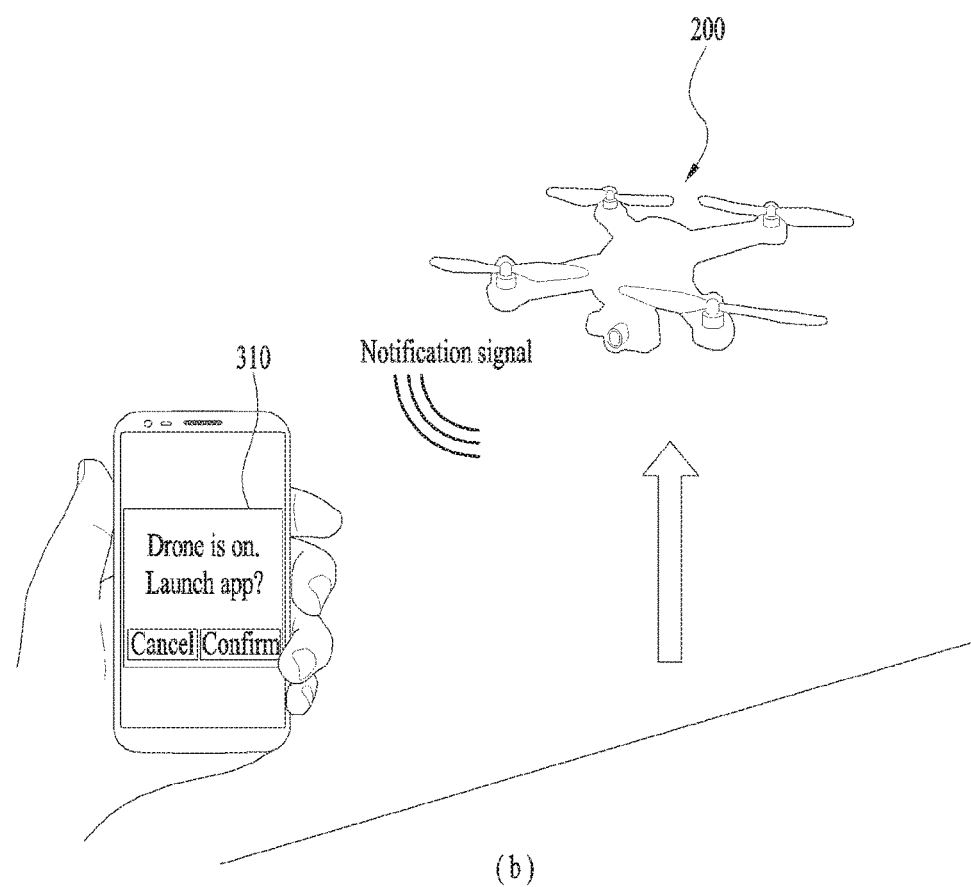
(b)

FIG. 5
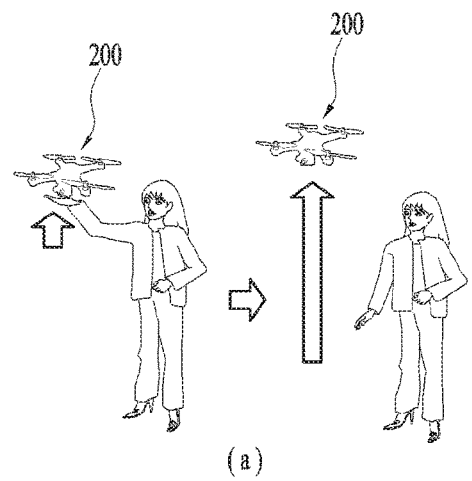
(a)
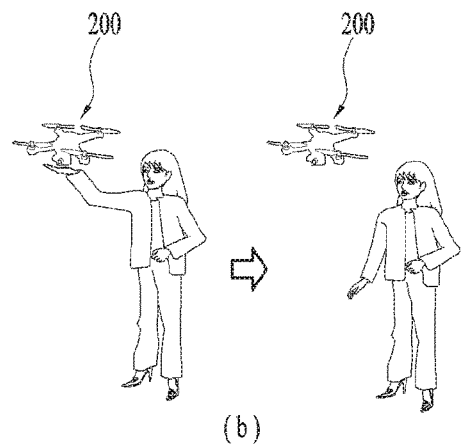
(b)
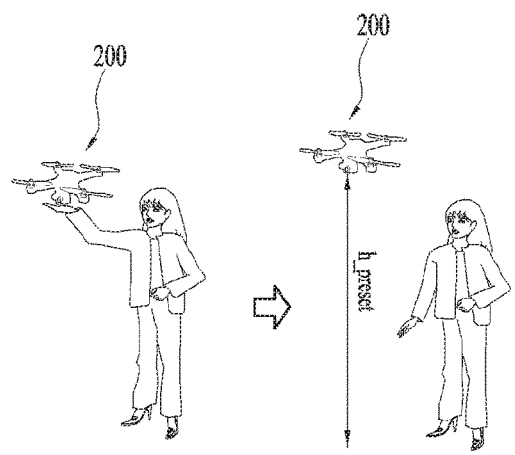
(c)

FIG. 6
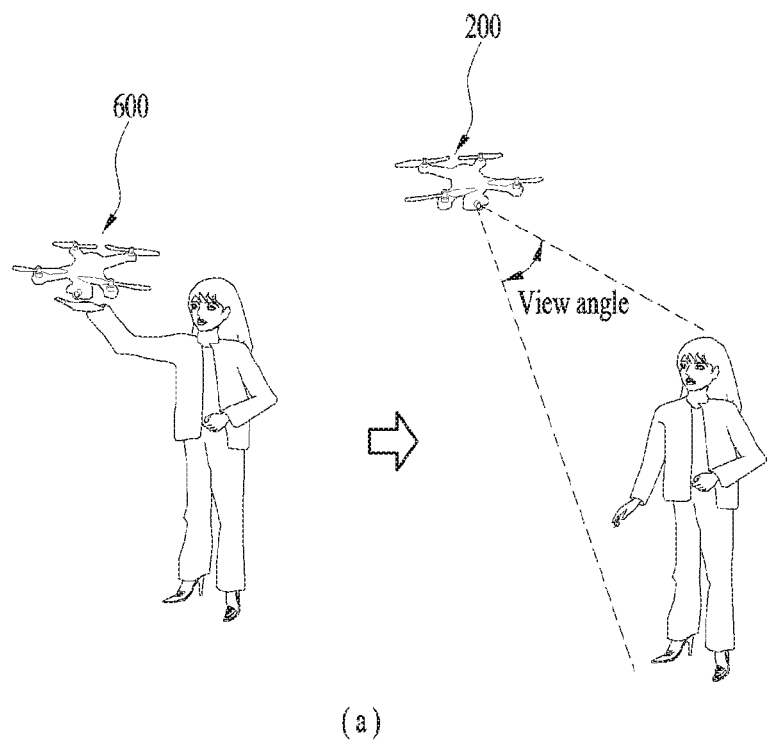
(a)
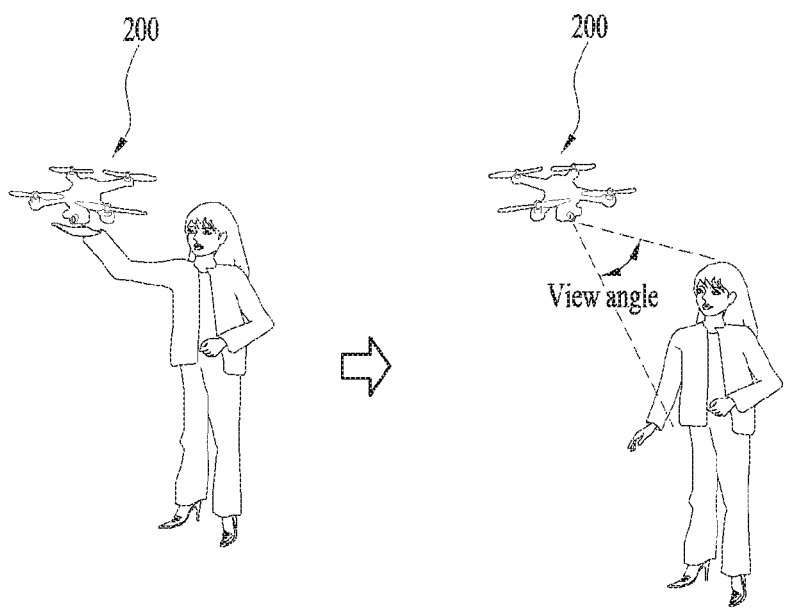
(b)

FIG. 7
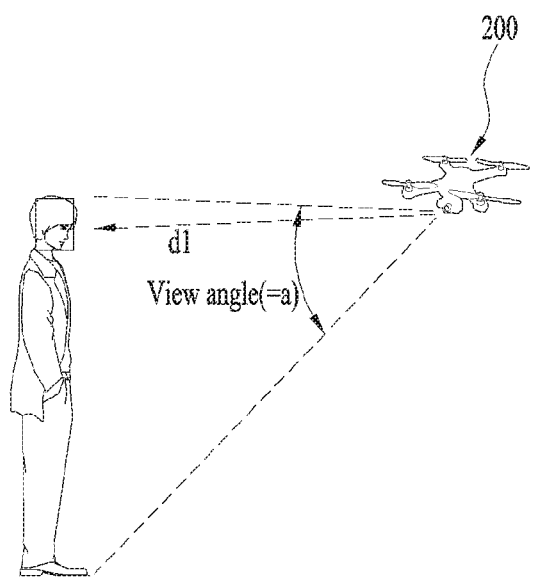
(a)
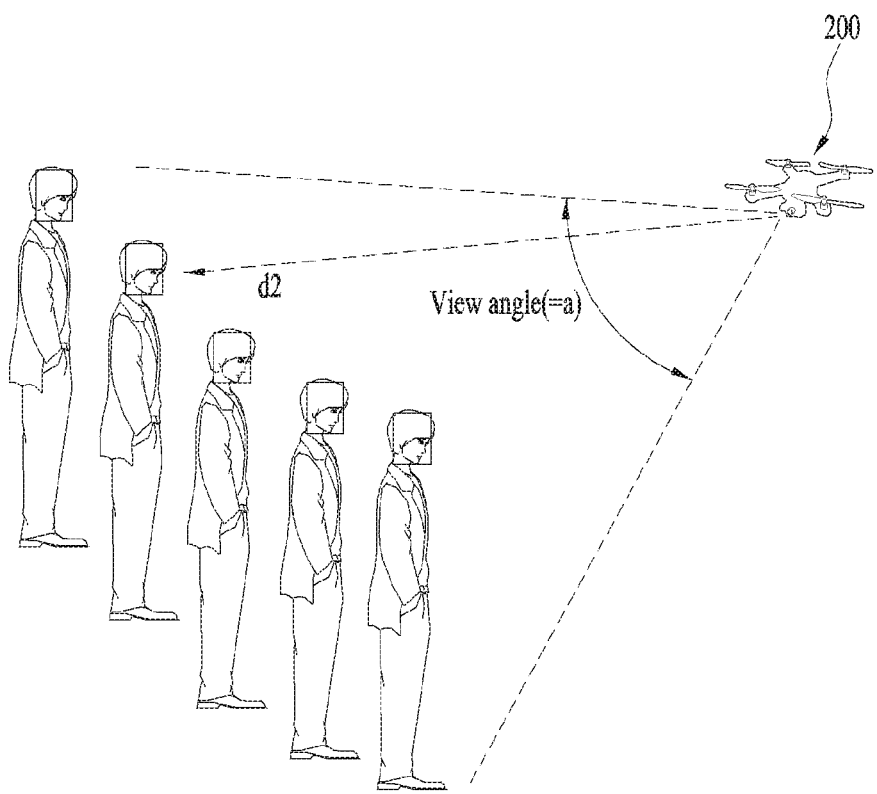
(b)

FIG. 8
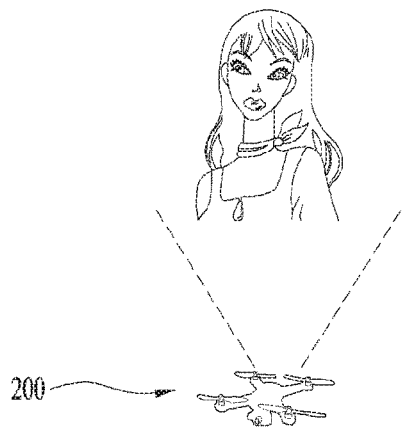
< Location of flying object >
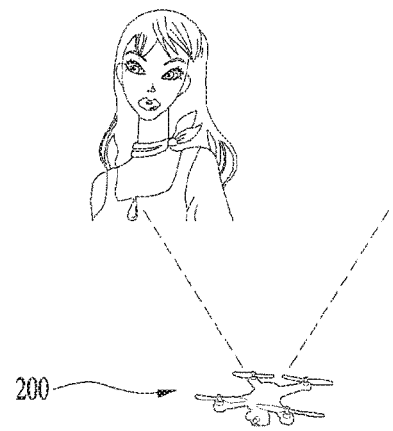
< Location of flying object (move to tight) >
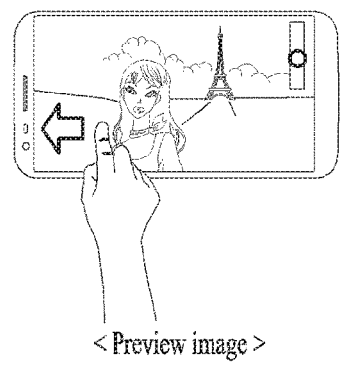
< Preview image >
(a)
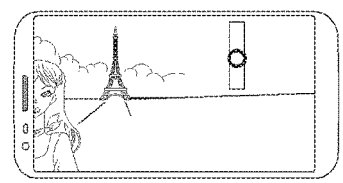
< Preview image >
(b)

FIG. 9
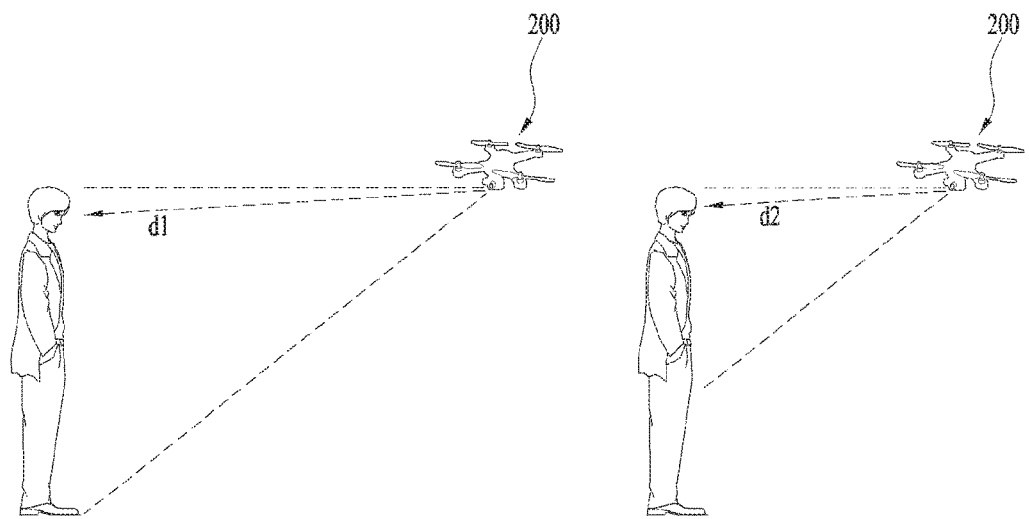
< Location of flying object >  < Location of flying object (move to tight) >
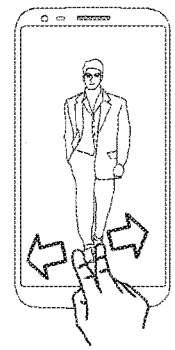
< Preview image >  < Preview image >
(a)  (b)

FIG. 10
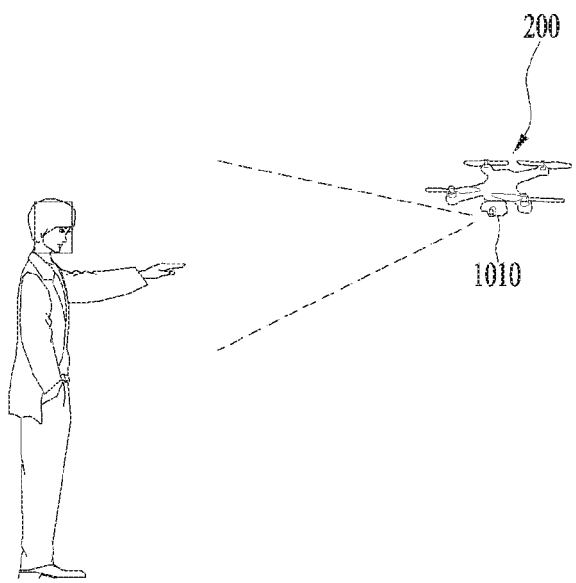
(a)
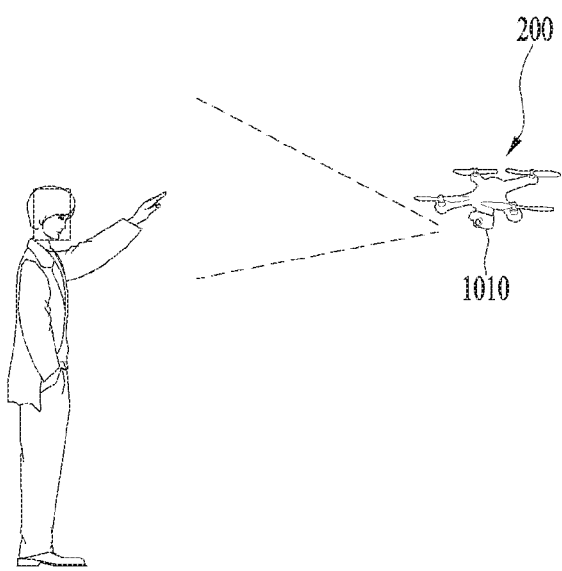
(b)

FIG. 11
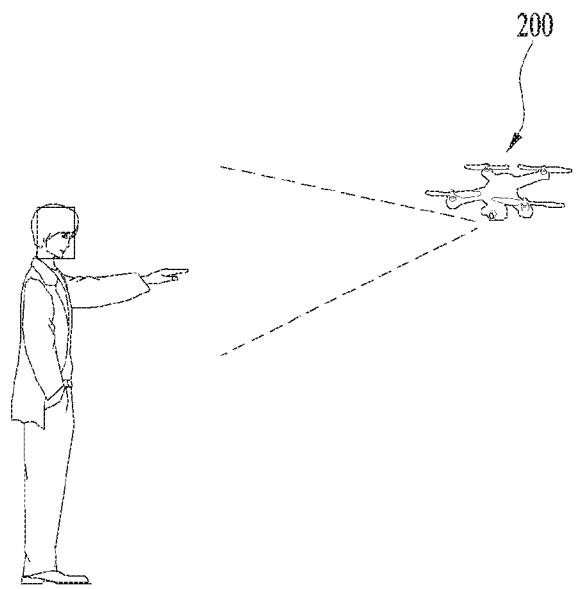
(a)
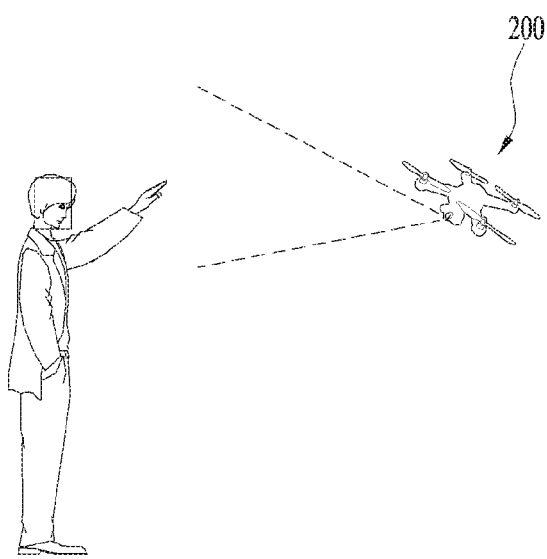
(b)

FIG. 12
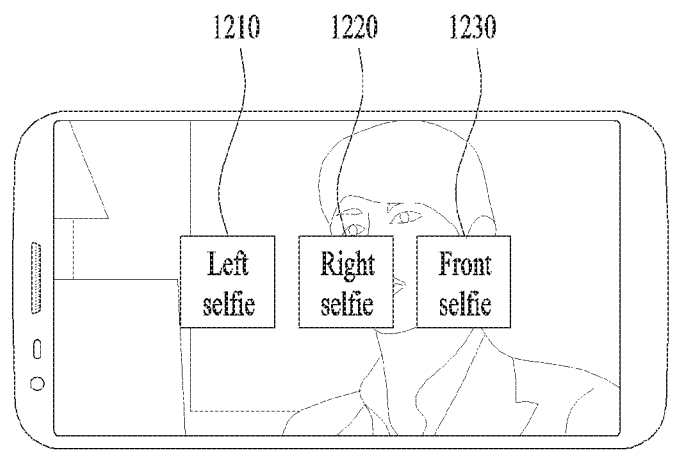
(a)
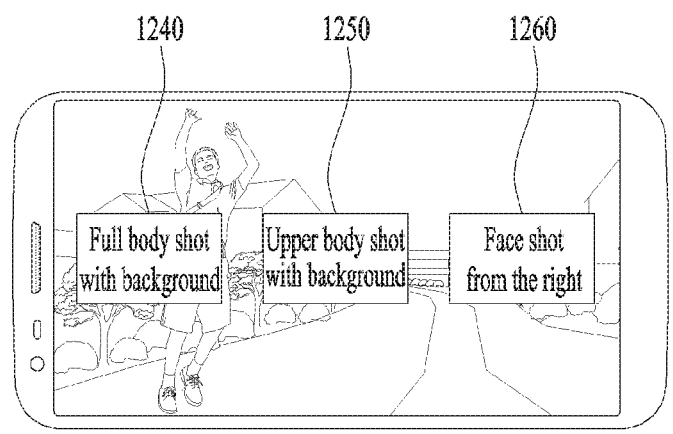
(b)

FIG. 13
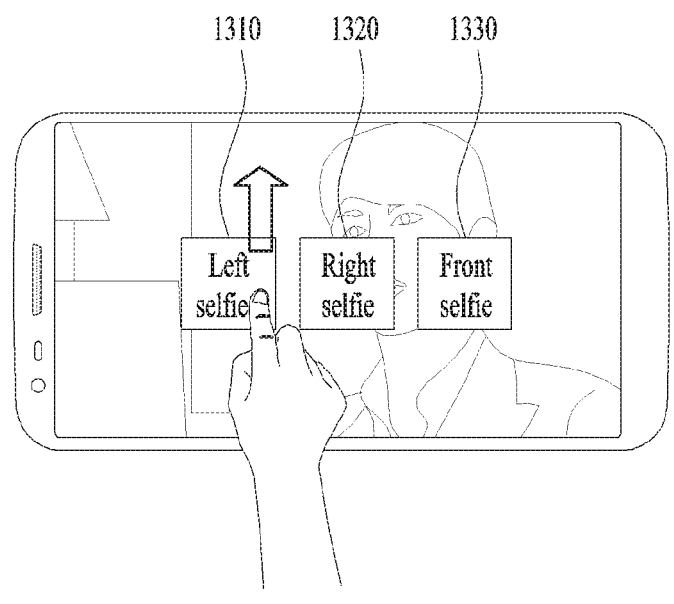
(a)
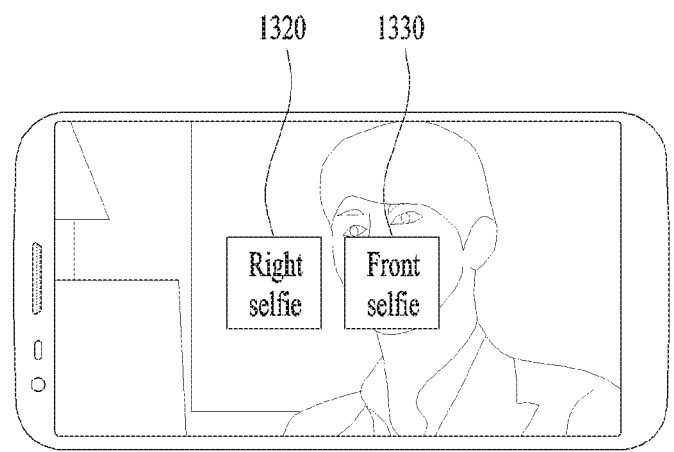
(b)

FIG. 14
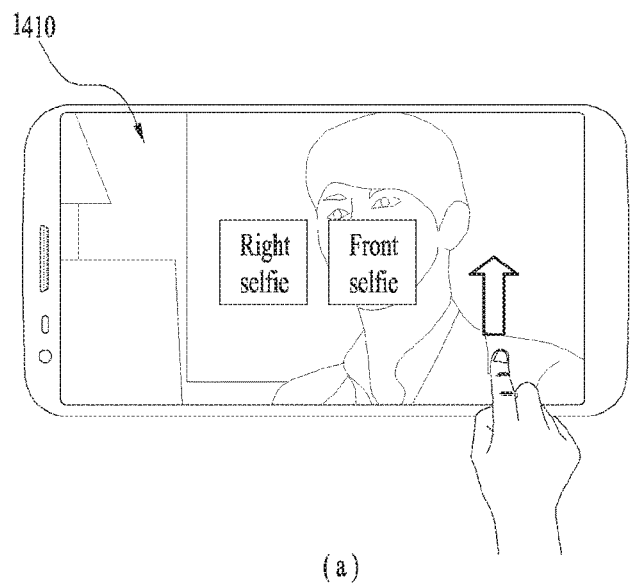
(a)
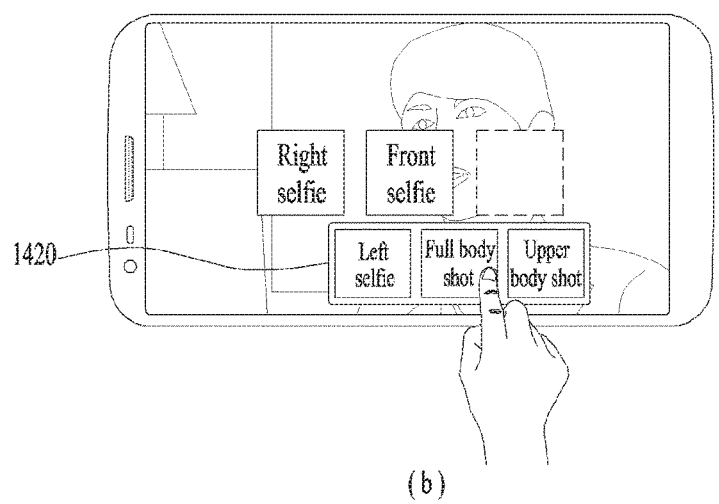
(b)
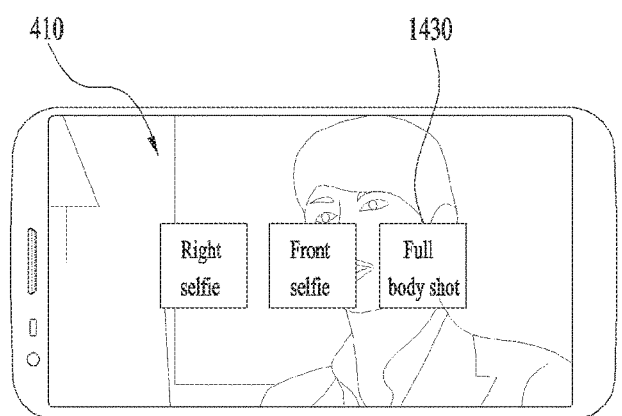
(c)

FIG. 16
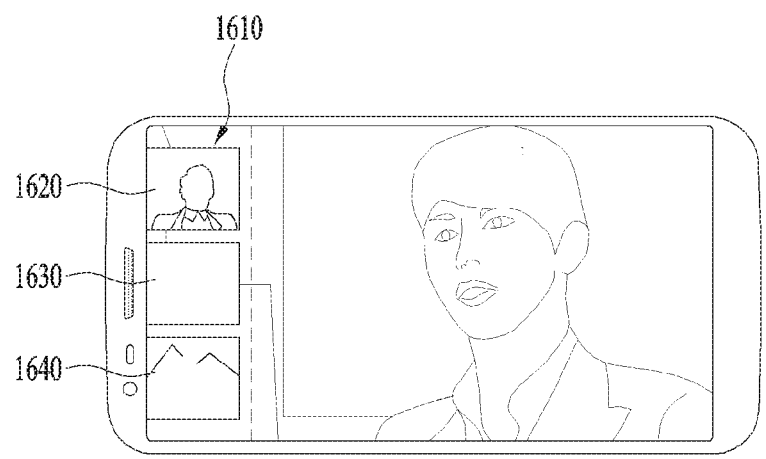
(a)
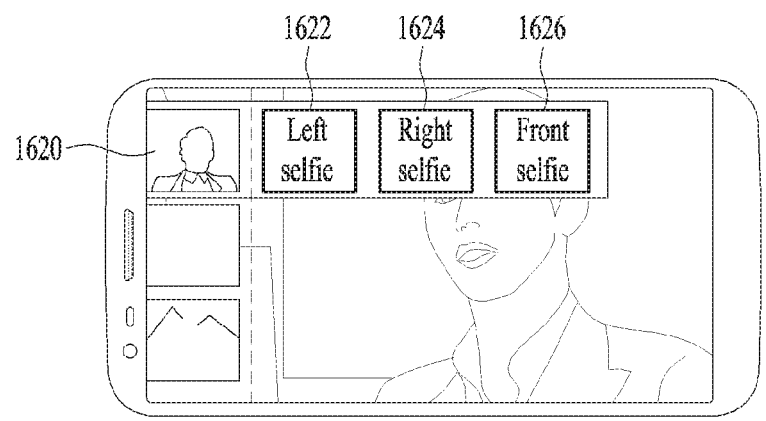
(b)

FIG. 17
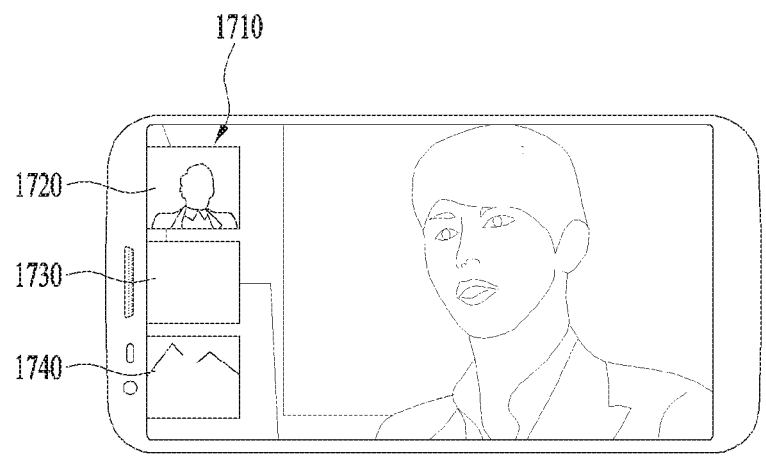
(a)
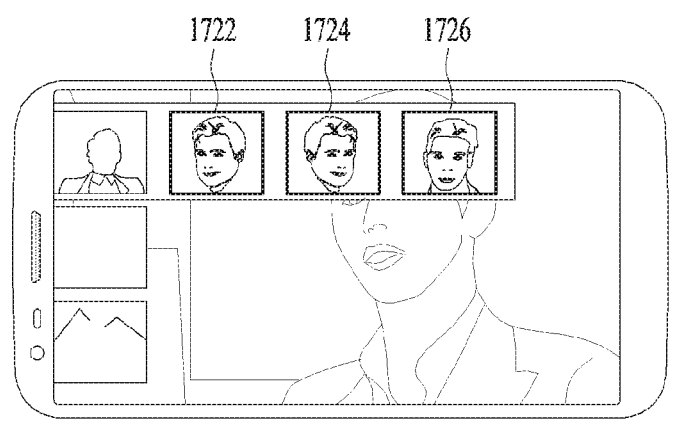
(b)

(a)          (b)

FIG. 20
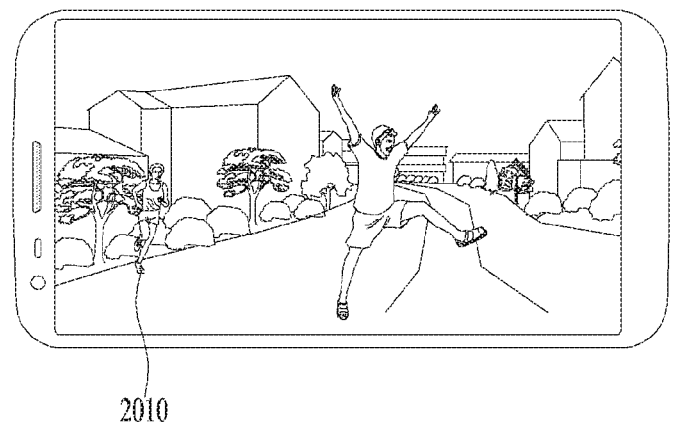
2010
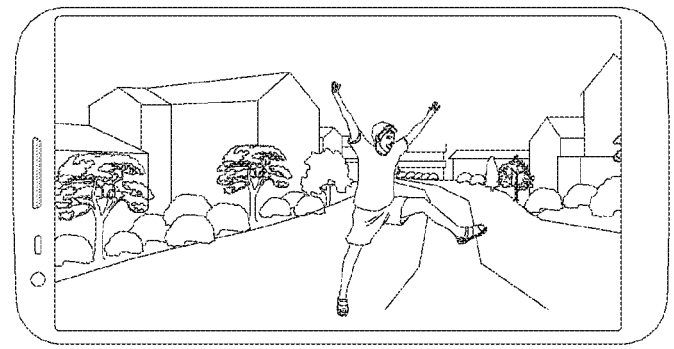

FIG. 25
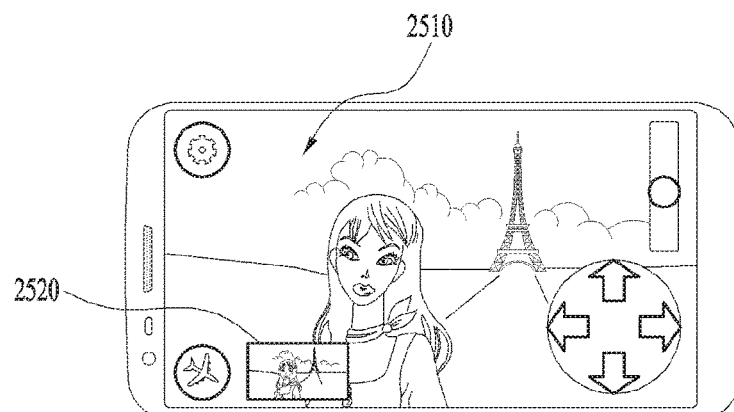
(a)
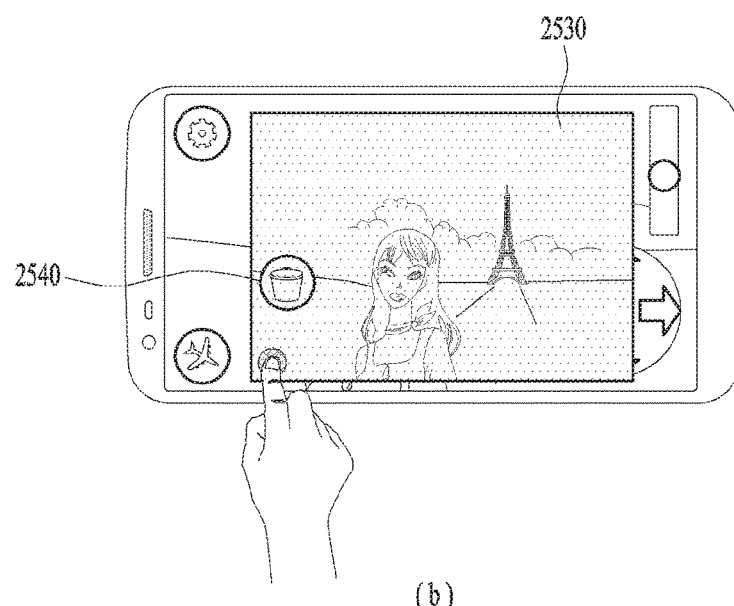
(b)
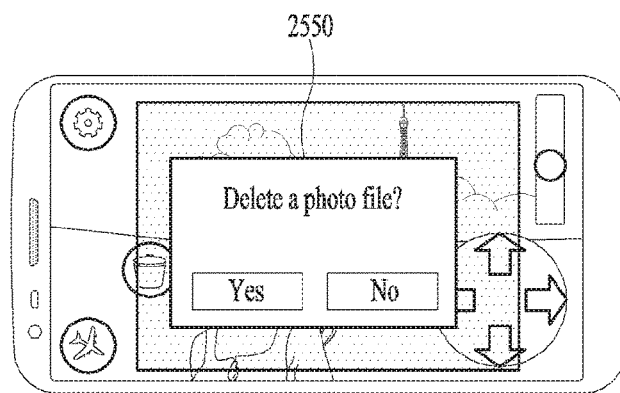
(c)

FIG. 26
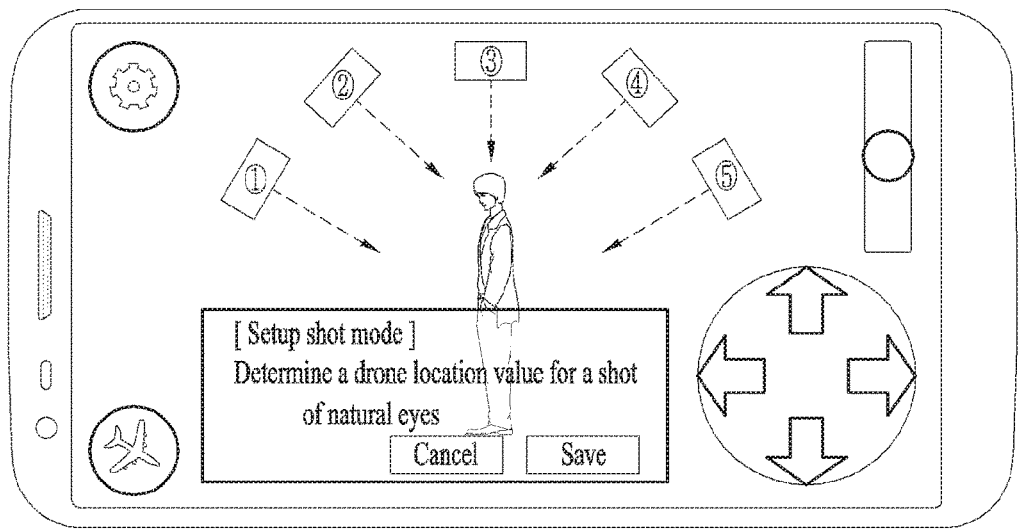
(a)
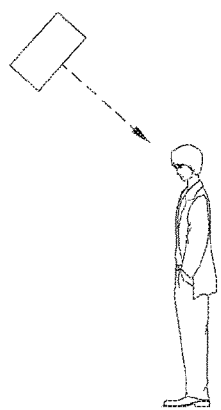
Location ② is set
(b)
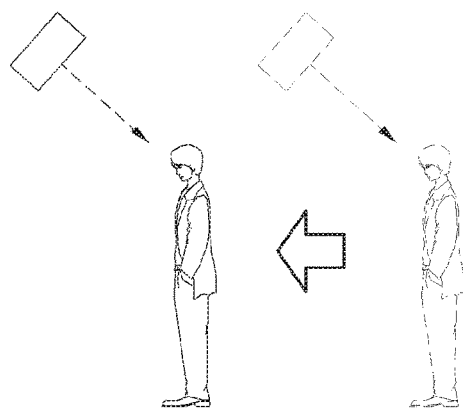
Location ② is held despite user's movement.
(c)

MOBILE TERMINAL AND CONTROLLING METHOD THEREOF

CROSS-REFERENCE TO RELATED APPLICATIONS

Pursuant to 35 U.S.C. § 119(a), this application claims the benefit of earlier filing date and right of priority to Korean Application No. 10-2015-0077770, filed on Jun. 2, 2015, the contents of which are all hereby incorporated by reference herein in its entirety.

BACKGROUND

Field

The present disclosure relates to a mobile terminal, and more particularly, to a mobile terminal and controlling method thereof. Although the present disclosure is suitable for a wide scope of applications, it is particularly suitable for remotely controlling a flying object equipped with a camera.

Background of the Disclosure

Terminals can be generally classified as mobile/portable terminals or stationary terminals. Mobile terminals may also be classified as handheld terminals or vehicle mounted terminals.

A function of a mobile terminal is diversifying. For instance, the function of the mobile terminal may include data and audio communication, picture and video capturing via a camera, voice recording, playing a music file via a speaker system and outputting an image or a video on a display unit. Some terminals perform a function of an electronic game or a function of a multimedia player. In particular, a latest mobile terminal can receive a multicast signal providing visual contents such as a broadcast, a video and a television program.

As a function of a terminal is diversified, the terminal is implemented in a multimedia player form equipped with complex functions including capturing a picture or a video, playing music or a video file, gaming, receiving a broadcast and the like for example.

The ongoing developments of the IT technology fields have influenced the field of flying objects. For instance, a helicam (helicopter camera) is used instead of a zimizib camera in a movie set. And, a drone is used for a delivery of a small product.

However, so far, only a flying trace of the above-mentioned flying object can be remotely controlled by a signal transmitted from a remote controller, a server or the like. Therefore, the present disclosure intends to propose a method of widely utilizing a flying object as a photographing device through linkage between the flying object and a mobile terminal in controlling the flying object equipped with a camera such as a helicam and the like.

Since a recently spotlighted wearable device of a glasses type is worn on a prescribed part of a user's body, it can be conveniently carried. Moreover, the wearable device of the glasses type may include a camera configured to photograph the same direction of user's eyes. In this case, an image taken through the camera may include an image of an area watched by a user currently wearing the wearable device of the glasses type.

If the image taken through the wearable device of the glasses type is outputted through a different terminal, a user of the different terminal can have the same user experience of the user currently wearing the wearable device of the glasses type.

The present disclosure intends to propose a user interface in case of sharing a photographed image taken through a wearable device with a different terminal.

SUMMARY OF THE DISCLOSURE

Accordingly, embodiments of the present disclosure are directed to a mobile terminal and controlling method thereof that substantially obviate one or more problems due to limitations and disadvantages of the related art.

An object of the present disclosure is to provide a mobile terminal and controlling method thereof, by which user's convenience can be enhanced.

In particular, one object of the present disclosure is to provide a mobile terminal and controlling method thereof, by which a flying object equipped with a camera can be controlled remotely.

Another object of the present disclosure is to provide a mobile terminal and controlling method thereof, by which a flight location of a flying object can be remotely controlled in accordance with a shot mode.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a mobile terminal according to one embodiment of the present disclosure may include a wireless communication unit configured to perform a communication with a flying object, a touchscreen configured to output a preview image received from the flying object, and a controller outputting a shot mode list on the preview image, the controller, if at least one shot mode is selected from the shot mode list, remotely controlling a flight location of the flying object in accordance with the selected at least one shot mode.

In another aspect of the present disclosure, as embodied and broadly described herein, a flying object according to another embodiment of the present disclosure may include a wireless communication unit configured to perform a communication with a mobile terminal, a flight unit configured to generate a life for a flight, a camera configured to take a shot, and a control unit, if a shot mode information is received from the mobile terminal, adjusting a flight location in accordance with a shot mode indicated by the shot mode information, the control unit, if a shot composition corresponding to the shot mode is formed, the control unit controls the shot to be taken through the camera.

In further aspect of the present disclosure, as embodied and broadly described herein, a method of controlling a mobile terminal according to further embodiment of the present disclosure may include the steps of outputting a preview image received from a flying object, outputting a shot mode list on the preview image, selecting at least one shot mode from the shot mode list, and remotely controlling a flight location of the flying object in accordance with the selected at least one shot mode.

Effects obtainable from the present disclosure may be non-limited by the above mentioned effect. And, other unmentioned effects can be clearly understood from the following description by those having ordinary skill in the technical field to which the present disclosure pertains.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 3 is a diagram for one example of launching a control application in a mobile terminal in response to turning on a flying object;

FIG. 5 is a diagram to describe an initial flight altitude of a flying object;

FIG. 6 is a diagram for one example that a flying object makes a flight at a location corresponding to a shot mode initially set to a default;

FIG. 7 is a diagram for one example of adjusting a location of a flying object in response to the number of the detected persons;

FIG. 8 and FIG. 9 are diagrams for one example of remotely adjusting a flight location of a flying object;

FIG. 10 is a diagram for one example of adjusting a camera rotation angle of a flying object in response to a gesture input;

FIG. 11 is a diagram for one example of rotating a body of a flying object;

FIG. 12 is a diagram for one example of adjusting a recommended shot mode depending on whether a shooting place is an indoor place;

FIG. 13 and FIG. 14 are diagrams for one example of editing a recommended shot mode list;

FIG. 16 is a diagram for one example of selecting a shot mode in accordance with a category;

FIG. 17 is a diagram for one example of setting a shot mode in accordance with a preset photo;

FIG. 19 and FIG. 20 are diagrams for one example of remotely adjusting a flight location of a flying object;

FIG. 25 is a diagram for one example of outputting a taken photo;

FIG. 26 is a diagram of one example for a flying object to take shots by tracking a subject;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
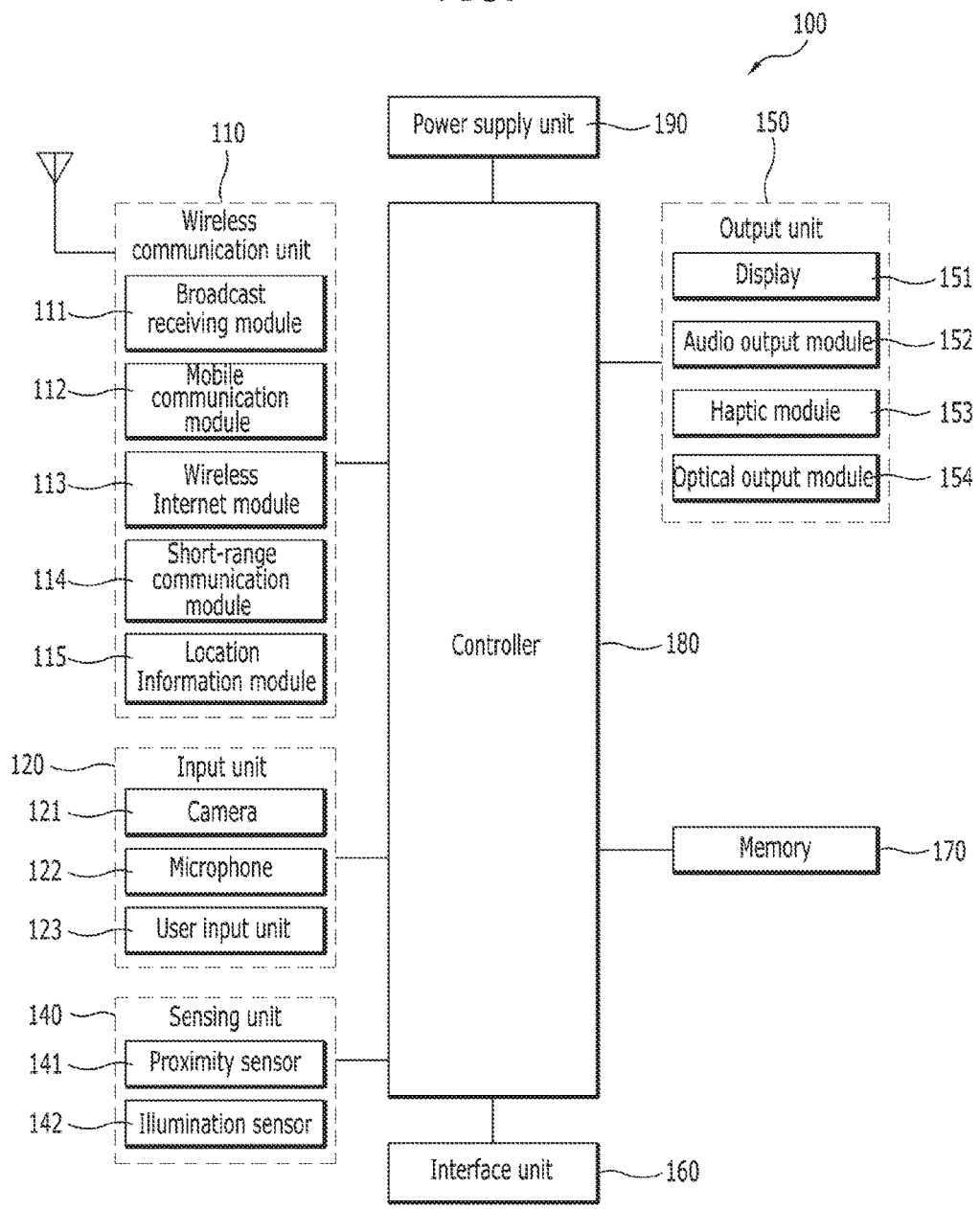
FIG. 1A is a block diagram of a mobile terminal in accordance with the present disclosure.
Figure 1B:
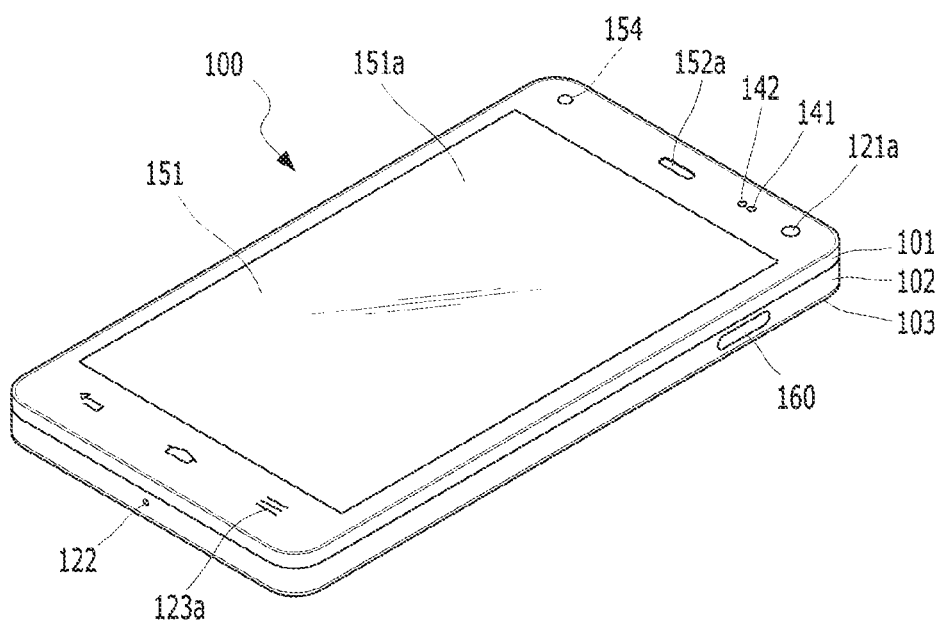
FIGS. 1B and 1C are conceptual views of one example of the mobile terminal, viewed from different directions.
Figure 1C:
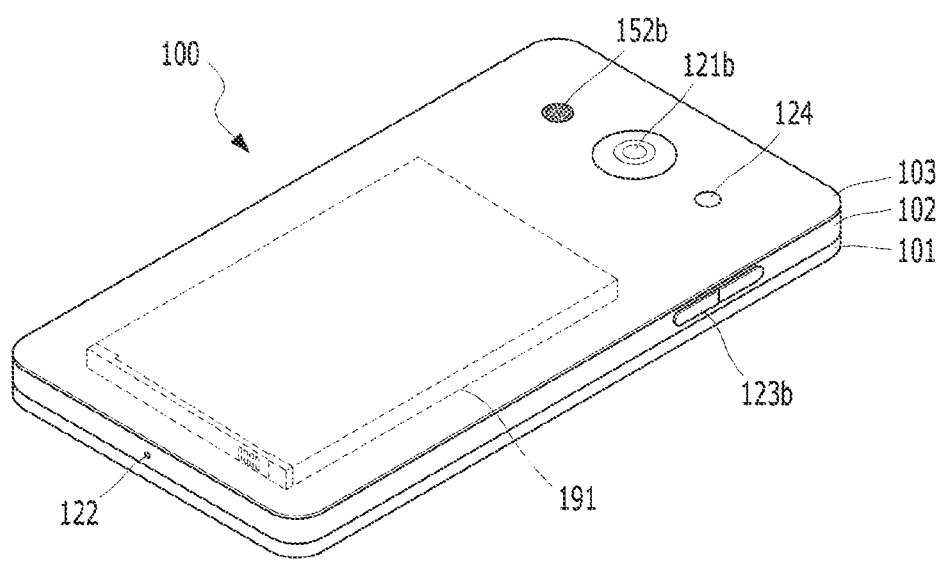

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

According to the present disclosure, a mobile terminal can be used to control a flying object. In this case, the flying object may mean an aircraft in shape of an airplane or helicopter flying by radio guidance without a person onboard and may include one of a drone, a helicam (helicopter camera), an RC (remote controlled) helicopter and the like. In particular, the mobile terminal can be used to remotely control a flight path and a flight speed of a drone, a helicam, an RC helicopter, or the like.

In this case, a camera may be installed on the flying object remotely controlled by the mobile terminal. Hence, the flying object can shoot a photo, a video and the like through the camera while flying. And, the camera can be remotely controlled by the mobile terminal.

According to the present disclosure, a mobile terminal configured to remotely control a flying object can include at least one of the components shown in FIGS. 1A to 1C. For instance, the mobile terminal according to the present disclosure may be assumed as including the wireless communication unit 110, the display unit 151, the memory 160 and the controller 180.

The wireless communication unit 110 can play a role in performing a wireless communication with a flying object. In particular, the controller 180 can transmit a remote control signal to the flying object through the wireless communication unit 110. And, the controller 180 can receive data from the flying object. In doing so, the communication system between the mobile terminal and the flying object may include at least one of Bluetooth, Wi-Fi, Zigbee and the like. Moreover, communication systems other than Bluetooth, Wi-Fi and Zigbee can be used for the communication between the mobile terminal and the flying object. For instance, the mobile terminal and the flying object can communicate with each other through such a mobile communication network as LTE, HSDPA, or the like. Yet, for clarity of the description, assume that the communication system between the mobile terminal and the flying object employs Bluetooth in the embodiments mentioned in the following description.

Besides, the mobile terminal according to the present disclosure shall be described in the following on the assumption that the display unit 151 includes a touchscreen. Of course, it is not necessary for the display unit 151 to include the touchscreen. If the display unit 151 does not include the touchscreen, touch inputs mentioned in the following description can be substituted with user inputs of different types (e.g., an action of pushing a physical button of the mobile terminal, a gesture input using the mobile terminal, etc.).

A camera for taking shots can be installed on the flying object. In particular, the camera installed on the flying object can be mounted in a manner of being tilted vertically (up and down) and horizontally (right and left).

For instance, the camera can be rotated vertically and horizontally by being combined with an electronic motor. By controlling the electronic motor, the flying object can rotate the camera at an optimal angle for recognizing a user's face. For another instance, the camera may be designed to be manually turned or rotated by a user.

Scales may be marked on an outer surface of the flying object to measure a tilted level of the camera. Hence, the user can recognize a rotated level of the camera using the scales.

For another instance, the camera may be provided with a sensor configured to measure a tilted level of the camera. In particular, the flying object may include a tilt detecting sensor configured to measure a tilted level of the camera and may further include a distance measuring sensor (e.g., an ultrasonic sensor, an infrared sensor, etc.) configured to measure a distance from a user.

The components required for configuring the flying object shall be described in detail with reference to FIG. 28 later.

Based on the above descriptions, the mobile terminal according to the present disclosure is described in detail as follows.

Figure 2:
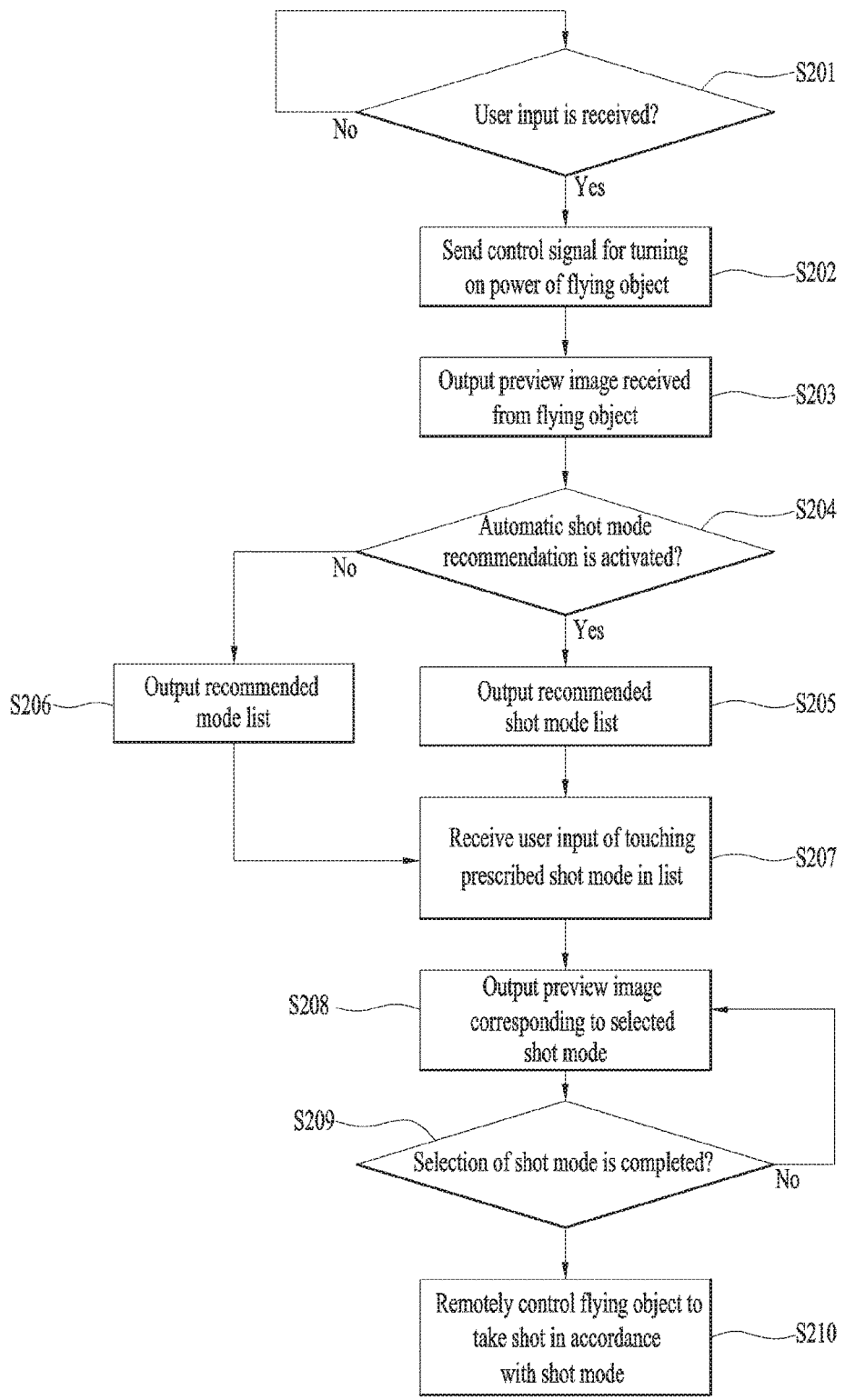
FIG. 2 is a flowchart for an operation of a mobile terminal according to one embodiment of the present disclosure.

FIG. 2 is a flowchart for an operation of the mobile terminal 100 according to one embodiment of the present disclosure.

Referring to FIG. 2, if a prescribed user input is received through the mobile terminal 100 [S201], the controller 180 of the mobile terminal 100 can transmit a control signal for turning on a power of a flying object 200 to the flying object 200 [S202].

If the power of the flying object 200 is turned on, the flying object 200 can transmit a notification signal to the mobile terminal 100 to indicate that the power of the flying object 200 has been turned on. If the notification signal is received from the flying object 200, the controller 180 launches a control application for controlling the flying object 200 and is then able to output a preview image taken through a camera of the flying object 200 [S203]. Based on a user manipulation on a user interface provided through the control application, the controller 180 may transmit a control signal for remotely controlling the flying object 200 to the flying object 200.

FIG. 3 is a diagram for one example of launching a control application in a mobile terminal in response to turning on a flying object.

Referring to FIG. 3, if a prescribed user input is received through the mobile terminal 100, as shown in FIG. 3 (a), the controller 180 of the mobile terminal 100 can transmit a control signal for turning on a power of a flying object 200 to the flying object 200 [S202]. In this case, the prescribed user input may include one of various input types such as a touch input of touching a button outputted through the display unit 151, a push input of pushing a physical button exposed on an outer surface of the mobile terminal 100, a gesture input using the mobile terminal 100, and the like.

If the flying object 200 enters a turned-on state, the flying object 200 can transmit a notification information to the mobile terminal 100 to notify that the flying object 200 is in the turned-on state. If so, referring to FIG. 3 (b), the controller 180 can control a popup window 310, which is provided to determine whether to launch a control application for remotely controlling the flying object 200, to be outputted.

If a user input for indicating to launch the control application is received through the popup window 310, the controller 180 can launch the control application.

The controller 180 can transmit control commands related to a flight path of the flying object 200, a shot mode of the flying object 200, a landing instruction of the flying object 200 and the like through the control application.

Figure 4:
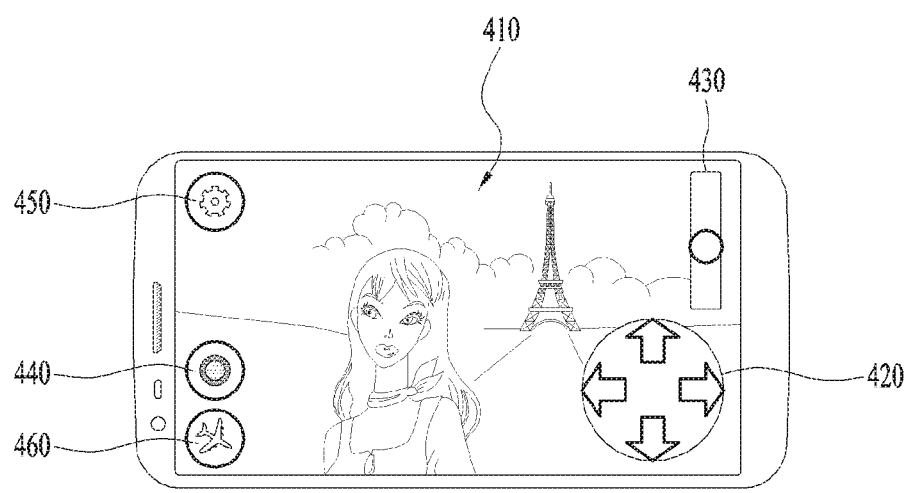
FIG. 4 is a diagram for one example of a user interface provided through a control application.

For instance, FIG. 4 is a diagram for one example of a user interface provided through a control application.

Referring to FIG. 4, once a control application is launched, the controller 180 can receive and output a preview image 410 received through a camera of a flying object 200. In this case, the preview image 410 may mean an image inputted through the camera of the flying object 200 before taking shots. A user checks whether a desired composition is created through the camera using the preview image 410 and is able to predict a shot to be taken.

On the preview image 410, a manipulating button 420 for adjusting a flight direction (e.g., forward, backward, right, and left) of the flying object 200, a manipulating button 430 for adjusting an altitude of the flying object 200, a manipulating button 440 for rotating the camera installed on the flying object 200 and the like can be outputted by overlaying. Based on user inputs to the manipulating buttons, the controller 180 can transmit a control signal for remotely controlling a flight direction, altitude and camera angle of the flying object 200 to the flying object 200.

In addition, through a control application, a setting button 450 for setting a shot mode of the flying object 200, a landing button 460 for instructing a landing of the flying object 200 and the like can be provided. Based on a user input to the setting button 450, the controller 180 can adjust a shot mode of the camera installed on the flying object 200. Based on a user input to the landing button 460, the controller 180 can transmit a control command for instructing the flying object 200 to stop a flight and make a landing to the flying object 200.

The controller 180 normally hides the above-mentioned buttons. Only if a user needs the hidden buttons, the controller 180 can control the hidden buttons to be outputted. For instance, if a user input of touching a preview image is received, the controller 180 can stop outputting the buttons. While the buttons stop being outputted, if a user input of touching the preview image is received again, the controller 180 can output the buttons again.

In the drawings for the following description, for clarity of the drawings, the buttons on the preview image shall be omitted if possible.

In the step S201 and FIG. 3 (*a*), the flying object 200 is turned on by the control signal received from the mobile terminal 100 for example. Unlike the example shown in the drawing, the flying object 200 can enter the turned-on state by a user input to a power button provided to the flying object 200. Although the flying object 200 is turned on by the power button, the flying object 200 can control the control application to be launched through the mobile terminal 100 by transmitting notification information to the mobile terminal 100.

For another instance, the controller 180 may transmit a control signal for turning on the flying object 200 based on a prescribed user input received in the course of running the control application. In doing so, since the control application has been run already, it is able to skip the step of launching the control application.

Once the flying object 200 enters the turned-on state, the flying object 200 can fly at an altitude corresponding to an initial turned-on state, an altitude higher than that of a turned-on state, or a preset altitude.

For instance, FIG. 5 is a diagram to describe an initial flight altitude of the flying object 200.

Referring to FIG. 5, after the flying object 200 has been turned on, when the flying object 200 is put on a user's palm, if the user takes a motion of lifting up the palm slightly, as shown in FIG. 5 (*a*), the flying object 200 can set an initial flight altitude to a height higher than that of the palm.

For another example, while the flying object 200 is put on the palm, if the power of the flying object 200 is turned on, as shown in FIG. 5 (*b*), the flying object 200 can set an initial flight altitude to a height of the palm.

In further example, if the power of the flying object 200 is turned on, as shown in FIG. 5 (*c*), the flying object 200 can set an initial flight altitude to a preset height. In particular, the preset height may be set to a specific height value or a specific condition (e.g., human eyes' height, etc.). According to the example shown in FIG. 5 (*c*), the flying object 200 start to fly with reference to an initially preset height (h_preset). In doing so, the flying object 200 can adjust a camera angle or a distance spaced apart from the mobile terminal 100 so as to photograph a user currently carrying the mobile terminal 100. For instance, the flying object 200 can adjust a camera angle or a distance spaced apart from the mobile terminal 100 so as to detect a face of a user currently carrying the mobile terminal 100.

For example, if a user's face is recognized through the image processing of an image inputted through the camera, the flying object 200 calculates an optimal composition for taking a photo of the user's face and is then able to finely adjust a camera angle, a flight altitude and a distance from the user.

For another example, after the flying object 200 has measured an altitude and a distance from a user through a sensor (e.g., an ultrasonic sensor, etc.), the flying object 200 can analogize a location of a user's face. If the location of the user's face is calculated, the flying object 200 can adjust a camera angle, a flight altitude and a distance from the user to fit the calculated location of the user's face.

Unlike the example described with reference to FIG. 5, the flying object 200 can make a flight at a location corresponding to a shot mode set to a default initially.

For instance, FIG. 6 is a diagram for one example that the flying object 200 makes a flight at a location corresponding to a shot mode initially set to a default.

Referring to FIG. 6, if the flying object 200 enters a turned-on state, the flying object 200 can make a flight at a height corresponding to a shot mode set to a default.

For example, if the shot mode set to the default corresponds to take a shot of a full body of a person, as shown in FIG. 6 (*a*), the flying object 200 can start to make a flight at a height appropriate for taking a shot of the full body of the person.

For example, if a user's face is recognized through an image processing of an image inputted through the camera, the flying object 200 calculates an optimal composition for taking a shot of a full body of the user and is then able to finely adjust a camera angle, a flight altitude and a distance from the user.

For another example, after the flying object 200 has measured an altitude and a distance from a user through a sensor (e.g., an ultrasonic sensor, etc.), the flying object 200 can analogize a location of the user. If the location of the user is calculated, the flying object 200 can adjust a camera angle, a flight altitude and a distance from the user to take a shot of a full body of the user in accordance with the calculated user's location.

For further example, if a shot mode set to a default corresponds to take a shot of a face of a person, as shown in FIG. 6 (*b*), the flying object 200 can start to make a flight at a height appropriate for taking a shot of the face of the person.

Likewise, based on an image processing of an image inputted through the camera or a measured distance, the flying object 200 can adjust a camera angle, a flight altitude, a distance from a user and the like to be appropriate for taking a shot of a face of a person.

As mentioned in the foregoing description, the flying object 200 can adjust a camera angle, a flight altitude, a distance from a user and the like in accordance with a shot mode. According to the example shown in FIG. 6 (*a*), since the distance from the person is too close to take a shot of a full body of the person, the flying object 200 moves away from the person.

In case that faces of a plurality of persons are detected through the camera of the flying object 200, the flying object 200 can fly to a right location to take a shot of a plurality of the persons.

For instance, FIG. 7 is a diagram for one example of adjusting a location of a flying object in response to the number of the detected persons. For clarity of the following description, assume that the flying object 200 initially makes a flight at a height of human eyes.

Referring to FIG. 7 (*a*), if a single person is detected through the camera of the flying object 200, the flying object 200 cam fly to a location spaced apart from the mobile terminal 100 by a first distance d1.

On the other hand, referring to FIG. 7 (b), as a plurality of persons are detected through the camera of the flying object 200, if the first distance d1 is not enough to take a shot of faces of a plurality of the persons, the flying object 200 can fly to a location spaced apart by a second distance d2 longer than the first distance d1 by increasing a spaced distance from the mobile terminal 100.

According to the above-described example, a plurality of the persons is detected through the camera of the flying object 200, by which a method of detecting a plurality of persons is non-limited. For example, the flying object 200 may be able to detect the number of persons by analyzing an audio component inputted through the microphone.

Based on the user inputs through the manipulating buttons on the control application, the controller 180 can adjust a flight location of the flying object 200, a camera rotation angle of the flying object 200 and the like. According to the example shown in FIG. 4, a flight direction of the flying object 200 can be adjusted based on the user input to the manipulating button for the flight direction adjustment and an altitude of the flying object 200 can be adjusted based on the user input to the manipulating button for the altitude adjustment. Moreover, the camera can be rotated up and down or right and left based on the user input to the manipulating button for adjusting the rotation angle of the camera.

For another example, based on a user's touch input or a gesture input, the controller 180 may remotely control a flight location or a camera rotation angle of the flying object 200.

For instance, FIG. 8 and FIG. 9 are diagrams for one example of remotely adjusting a flight location of the flying object 200.

Referring to FIG. 8, while a preview image received from the flying object 200 is displayed through the display unit 151, if a user input of dragging to move a pointer currently touching the preview image in a prescribed direction is received, the controller 180 can transmit a control signal, which instructs the flying object 200 to move in a direction opposite to the drag direction (or the drag direction), to the flying object 200. According to the example shown in FIG. 8 (a), if the pointer currently touching the preview image is dragged to move in a left direction, the controller 180 can transmit a control signal, which instructs the flying object 200 to move in a right direction, to the flying object 200. According to the example shown in FIG. 8 (b), as the flying object 200 moves in the right direction, a composition of the preview image outputted through a control application will be changed as well.

Referring to FIG. 9, while a preview image received from the flying object 200 is displayed through the display unit 151, if a pinch-in/out input is received, the controller 180 can transmit a control signal, which instructs the flying object 200 to move forward/backward, to the flying object 200. According to the example shown in FIG. 9 (a), if a touch input (i.e., a pinch-out input) of increasing a distance between two pointers currently touching the preview image is received, the controller 180 can transmit a control signal, which instructs the flying object 200 to move forward, to the flying object 200. As the flying object 200 moves forward, a composition of the preview image outputted through a control application will be changed as well. According to the example shown in FIG. 9 (b), in the preview image, a composition of taking a shot of a full body of a user is changed to a composition of taking a shot of an upper body of the user.

FIG. 10 is a diagram for one example of adjusting a camera rotation angle of the flying object in response to a gesture input.

Referring to FIG. 10, if a gesture input of moving a user's hand up and down or right and left is detected through an image inputted through the camera, the flying object 200 can rotate the camera up and down or right and left in response to the user's gesture input.

According to the example shown in FIG. 10 (a) and FIG. 10 (b), if a gesture of lifting up a hand is detected, the flying object 200 can control the camera 1010 to be rotated upward while maintaining a flight location. In particular, the flying object 200 can rotate the camera up and down using a motor connected to the camera 1010. Besides, if a gesture of lowering down a hand is detected, the flying object 200 can control the camera 1010 to be rotated downward while maintaining a flight location [not shown in the drawing].

Unlike the example shown in the drawing, if an appropriate touch gesture is inputted to the mobile terminal 100, the camera 1010 can be rotated up and down.

Thus, in case that the camera 1010 is rotated in response to the gesture input or the touch input, the user can rotate the camera 1010 installed on the flying object 200 up and down or right and left while watching a preview image displayed on the mobile terminal 100, which is taken through the camera 1010.

If a user's face deviates from the preview image due to the rotation of the camera, the flying object 200 can control a composition for taking a shot of the user's face to be created by automatically raising or lowering a flight altitude. In doing so, the flying object 200 can determine whether the composition for taking the shot of the user's face is created through an image processing of an image inputted through the camera or a distance measurement using a sensor, or the like.

The flying object 200 can rotate a body of its own instead of rotating the camera.

For instance, FIG. 11 is a diagram for one example of rotating a body of the flying object 200.

Referring to FIG. 11, if a gesture input of moving a user's hand up and down or right and left is detected through an image inputted through the camera, the flying object 200 can rotate its body up and down or right and left in response to the user's gesture input.

According to the example shown in FIG. 11 (a) and FIG. 11 (b), if a gesture of lifting up a hand is detected, the flying object 200 can rotate its body upward. As the body is rotated, the camera installed on the flying object 200 can be rotated upward.

In particular, based on the correlation between an inclination angle, at which the flying object 200 will incline, and inertia moment data, the flying object 200 can determine an output per propeller. For example, if a front output value of the flying object 200 and a rear output value of the flying object 200 are different from each other, the flying object 200 will incline to a prescribed side. Based on a sensing value of a sensing unit (e.g., an IMU (inertial motion unit) unit, etc.), the flying object 200 can determine whether a rotation of the flying object 200 reaches a target value.

Although the rotation of the flying object 200 has reached the target value, if the flying object 200 is located at a position difficult to take a shot of a user's face, the flying object 200 can control a composition, in which a shot of the user's face can be taken, to be created by raising or lowering a flight altitude. In doing so, the flying object 200 can determine whether the composition for taking a shot of the user's face is created through an image processing of an image inputted through the camera, a distance measurement using a sensor, or the like.

Yet, in case that a body of the flying object 200 is rotated, since it is difficult for the flying object 200 to hover, the flying object 200 may maintain the body rotated state for a prescribed time only. For example, when the flying object 200 inclines at a target value, the flying object 200 can be controlled to maintain a horizontal level right after taking a shot. In doing so, in order to prevent a shot to be distorted due to the movement of the flying object 200, the flying object 200 can automatically adjust the settings of the camera. For example, through adjustments of aperture value, photographic speed (ISO), shutter speeds and the like, the flying object 200 can suppress the shot distortion due to the movement as far as possible. For another example, the flying object 200 activates an OIS (optical image stabilization) function, thereby suppressing the shot distortion due to the movement as far as possible.

As the body of the flying object 200 is rotated, if the flying object 200 leaves a flight location, the flying object 200 can return to the original flight location after taking a shot. In particular, the flying object 200 estimate and calculate a deviation displacement of the flying object 200 based on a sensing value of a sensor (e.g., IMU sensor, OFS (optical fiber sensor, etc.) and the like and is then able to return to the previous location by flying back by the calculated displacement. Alternatively, the flying object 200 may return to the previous location in comparison to a measurement value (e.g., a flight altitude, a distance from a user, etc.) of a distance measurement sensor before shooting.

The gesture input (i.e., a gesture input of moving a hand by spreading out fingers) shown in FIG. 10 or FIG. 11 is taken as one example for clarity of the description only, by which the present disclosure is non-limited. And, it is a matter of course that the camera can be rotated by a gesture input of a different type. For instance, the camera can be rotated up and down or right and left by a gesture input of turning a head. In particular, if a gesture input of lifting user's head is detected, the flying object 200 can control the camera to be rotated upward in response to the user's gesture input.

According to the example described with reference to FIG. 8, in response to the touch input of touching the display unit 151, the flight location of the flying object 200 can be adjusted. Unlike this example, in response to a user's gesture input, a flight location of the flying object 200 may be adjusted.

On the other hand, unlike the examples shown in FIG. 10 and FIG. 11, in response to a touch input of touching the display unit 151, a rotation angle of the camera installed on the flying object 200 may be adjusted.

In accordance with a setting value, the controller 180 can automatically recommend a shot mode of the flying object 200. For instance, if a setting value for a shot mode automatic recommendation is 'enable' [S204], the controller 180 can control an automatically recommended shot mode list to be outputted after launching a control application [S205]. When the shot mode is recommended, it is able to consider conditions such as 'whether a shooting place is an indoor place', 'whether a shot target includes a plurality of persons', 'weather', 'use frequency', 'place' and the like.

For instance, FIG. 12 is a diagram for one example of adjusting a recommended shot mode depending on whether a shooting place is an indoor place.

Referring to FIG. 12, if a shooting place is an indoor place, since it is difficult for the flying object 200 to make a flight at a high altitude in the indoor place, the controller 180 can preferentially recommend a face shot mode appropriate for the flying object 200 to take a shot by flying at a low altitude. According to the example shown in FIG. 12 (a), as the shooting place is determined as the indoor place, a shot mode (hereinafter named 'left selfie') 1210 for taking a shot of a face from the left, a shot mode (hereinafter named 'right selfie') 1220 for taking a shot of a face from the right, and a shot mode (hereinafter named 'front selfie') 1230 for taking a shot of a face from the front are included in a recommended shot mode list.

If a shooting place is an outdoor place, the controller 180 can recommend a full body shot mode, a landscape (or scenery) shot mode or the like, which is appropriate for the flying object 200 to take a shot by flying at a high altitude. According to the example shown in FIG. 12 (b), as the shooting place is determined as the outdoor place, a shot mode (hereinafter named 'full body shot with a background') 1240 for taking a shot of a full body with a background, a shot mode (hereinafter named 'upper body shot with a background') 1250 for taking a shot of an upper body with a background, and a shot mode 1260 for taking a shot of a face are included in a recommended shot mode list.

In this case, based on an illumination intensity value measured through an illumination sensor (or an illumination intensity value received from the flying object 200), a location information obtained through the position location module and/or the like, the controller 180 can determine whether the shooting place is the indoor place or the outdoor place.

Besides, in addition to the example shown in FIG. 12, the controller 180 can recommend a shot mode by considering conditions such as 'whether a shot target includes a plurality of persons', 'weather', 'use frequency', 'place' and the like.

For example, if a shot target includes a plurality of persons, a shot mode appropriate for taking a shot of a plurality of persons is preferentially recommended. If a shot target includes a single person, a shot mode appropriate for taking a shot of a single person can be preferentially recommended. As mentioned in the foregoing description, it is able to determine whether a shot target includes a plurality of subjects or a single subject through an image taken through the camera of the flying object 200, an analysis of audio inputted through the microphone of the flying object 200, and/or the like.

The controller 180 may preferentially recommend a prescribed number of shot modes frequently used by a user. For example, if a user's shot mode use frequency order is '1. Face shot from the left, 2. Full body shot with scenery, 3. Upper body shot with scenery, 4. Full body shot without scenery, 5. Face shot from the front', the controller 180 can provide a recommended shot mode list in order of high use frequency among the shot modes. For example, if the controller 180 intends to provide 3 shot modes, the controller 180 can output a shot mode list including '1. Face shot from the left, 2. Full body shot with scenery, 3. Upper body shot with scenery' in order of high shot mode use frequency.

In doing so, the controller 180 can calculate the use frequency number for the shot modes through an analysis of photos saved in the memory 170.

The controller 180 may recommend shot modes in consideration of the use frequency number of per-place shot modes. For example, assume that when a photo is taken at a $1^{st}$ place, the use frequency number of shot modes is '1. Face shot from the left, 2. Full body shot with scenery, 3.

Upper body shot with scenery, 4. Full body shot without scenery, 5. Face shot from the front'. And, assume that when a photo is taken at a $2^{nd}$ place, the use frequency number of shot modes is '1. Face shot from the right, 2. Face shot from the left, 3. Full body shot with scenery, 4. Full body shot without scenery, 5. Face shot from the front'. In this case, if the mobile terminal 100 is located at the $1^{st}$ place, the controller 180 can output a shot mode list including '1. Face shot from the left, 2. Full body shot with scenery, 3. Upper body shot with scenery' in consideration of the shot mode use frequency number at the $1^{st}$ place. If the mobile terminal 100 is located at the $2^{nd}$ place, the controller 180 can output a shot mode list including '1. Face shot from the right, 2. Face shot from the left, 3. Full body shot with scenery' in consideration of the shot mode use frequency number at the $2^{nd}$ place.

In doing so, the controller 180 can calculate the use frequency number per place through location information of the photos saved in the memory 170.

The controller 180 can adjust a shot brightness in consideration of the weather. For example, if the weather is sunny, the shot brightness can be lowered. If the weather is rainy, the shot brightness can be raised. In this case, the shot brightness can be adjusted through an exposure value (EV), a shutter speed, an aperture value and/or the like.

The controller 180 can edit the shot mode list using a user input to the recommended shot mode list.

For instance, FIG. 13 and FIG. 14 are diagrams for one example of editing a recommended shot mode list.

Referring to FIG. 13, while a recommended shot mode list including at least one or more shot modes is outputted, after a prescribed item is selected from the outputted recommended shot mode list, if a drag input of dragging to move the selected item in a prescribed direction is received, the controller 180 can control the shot mode, which corresponds to the selected item, to be deleted from the recommended shot mode list.

For example, while a recommended shot mode list including a left selfie mode 1310, a right selfie mode 1320 and a front selfie mode 1330 is outputted, if a user input of dragging to move a pointer currently touching the left selfie mode 1310 in a prescribed direction is received [FIG. 13 (a)], the controller 180 can control the left selfie mode 1310 to be deleted from the recommended shot mode list [FIG. 13 (b)]. In this case, the prescribed direction may include a direction vertical to a direction in which each item on the recommended shot mode list is arranged. Like the example shown in FIG. 13 (a), when the each item on the recommended shot mode list is arranged horizontally, only if a user input of dragging to move a pointer currently selecting a specific item in a vertical direction is received, the controller 180 can delete the shot mode corresponding to the selected item from the recommended shot mode list.

According to the example shown in FIG. 13 (a), as the pointer currently touching the left selfie mode 1310 is dragged to move in a top direction, the left selfie mode 1310 can be deleted from the recommended shot mode list. Moreover, if the pointer currently touching the left selfie mode 1310 is dragged to move in a bottom direction, the left selfie mode 1310 can be deleted from the recommended shot mode list as well.

Referring to FIG. 14, for another instance, if a prescribed user input is received, the controller 180 can control a shot mode candidate list, which is provided to select a shot mode to add to the recommended shot mode list, to be outputted.

For example, if a drag input toward a recommended shot mode list 1410 is received [FIG. 14 (a)], the controller 180 can control a shot mode candidate list 1420, which includes shot mode candidates to add to the recommended shot mode list 1410, to be outputted [FIG. 14 (b)]. If a prescribed shot mode candidate is selected from the shot mode candidate list 1420 shown in FIG. 14 (b), the controller 180 can control the selected shot mode candidate to be added to the recommended shot mode list 1420 [FIG. 14 (c)]. According to the example shown in FIG. 14 (c), a full body shot mode 1430 is added to the recommended shot mode list 1410 by a user's selection.

If a user input for selecting at least one shot mode from the recommended shot mode list is received [S207], the controller 180 can control the flying object 200 to adjust the camera angle, the flight altitude and the distance from the shot target to meet the selected shot mode. In particular, the controller 180 can transmit information on the selected shot mode to the flying object 200. If so, the flying object 200 can adjust the camera angle, the flight altitude and the distance from the shot target to meet the received shot mode.

For example, if the face shot mode is selected, the controller 180 can transmit shot mode information, which indicates that the face shot mode has been selected, to the flying object 200. If so, the flying object 200 moves to a flight location for taking a shot of a user's face through an image processing, a distance measurement and/or the like or may adjust a shot angle to take a shot of the user's face.

As the flight location of the flying object 200 is changed, a preview image corresponding to the user-touched shot mode can be outputted through the display unit 151 of the mobile terminal [S208].

If the selection of the shot mode is complete (e.g., the confirm button shown in FIG. 3 or FIG. 4 is touched) [S209], the controller 180 can transmit an information on the selected shot mode to the flying object 200. If so, the flying object 200 can take a shot in accordance with the received shot mode [S210].

For example, if the face shot mode is selected, the mobile terminal 100 may transmit shot mode information, which indicates that the face shot mode has been selected, or a control signal for moving the flying object 200 to a flight location corresponding to the face shot mode to the flying object 200. In particular, the controller 180 calculates a flight altitude corresponding to the face shot mode and a distance from the mobile terminal 100 and is then able to remotely control the flight location of the flying object 200.

If so, the flying object 200 moves to a location for taking a shot of a user's face from the left and is then able to adjust a rotation angle of the camera to take the shot of the user's face. For example, the flying object 200 can rotate the camera to take a shot of a left side of the user's face while flying at user's eye height and location in view of the left side of the user's face. In doing so, the flying object 200 can adjust a flight altitude, a flight location, a camera rotation angle and/or the like through an analysis of an image inputted through the camera.

If it is determined that a state of taking a shot of the left side of the user's face is entered through the analysis of the image inputted through the camera of the flying object 200, the flying object 200 can take a shot. In doing so, in order to inform the user that a shot is going to be taken, the flying object 200 can output a prescribed feedback before taking a shot (or, as soon as the shot is taken). In this case, the feedback may include at least one of an LED flicker, a sound output and the like, by which the present embodiment is non-limited.

For another example, before taking a shot (or, as soon as the shot is taken), the flying object 200 may transmit a notification information, which notifies the mobile terminal 100 that a shot is going to be taken, to the mobile terminal 100. Having received the notification information, the mobile terminal 100 outputs a feedback, thereby informing a user that a shot is going to be taken. In this case, the feedback may include at least one of an LED flicker, a sound output, a vibration output and the like, by which the present embodiment is non-limited.

In case that a plurality of shot modes are selected as recommended shot modes, the flying object 200 can take shots sequentially to cope with a plurality of the shot modes, respectively.

For example, if a face shot from the left, a face shot from the right and a face shot from the front are selected as a plurality of the shot modes, the flying object 200 can sequentially take shots in accordance with the shot modes, respectively. Hence, the flying object 200 may take a shot of the user's face from the left, take a shot of the user's face from the right, and then take a shot of the user's face from the front.

If a setting value for the automatic shot mode recommendation is 'disabled' [S204], the controller 180 can output a shot mode list for a user to select a shot mode through a user manipulation on a user interface provided through a control application [S206].

Figure 15:
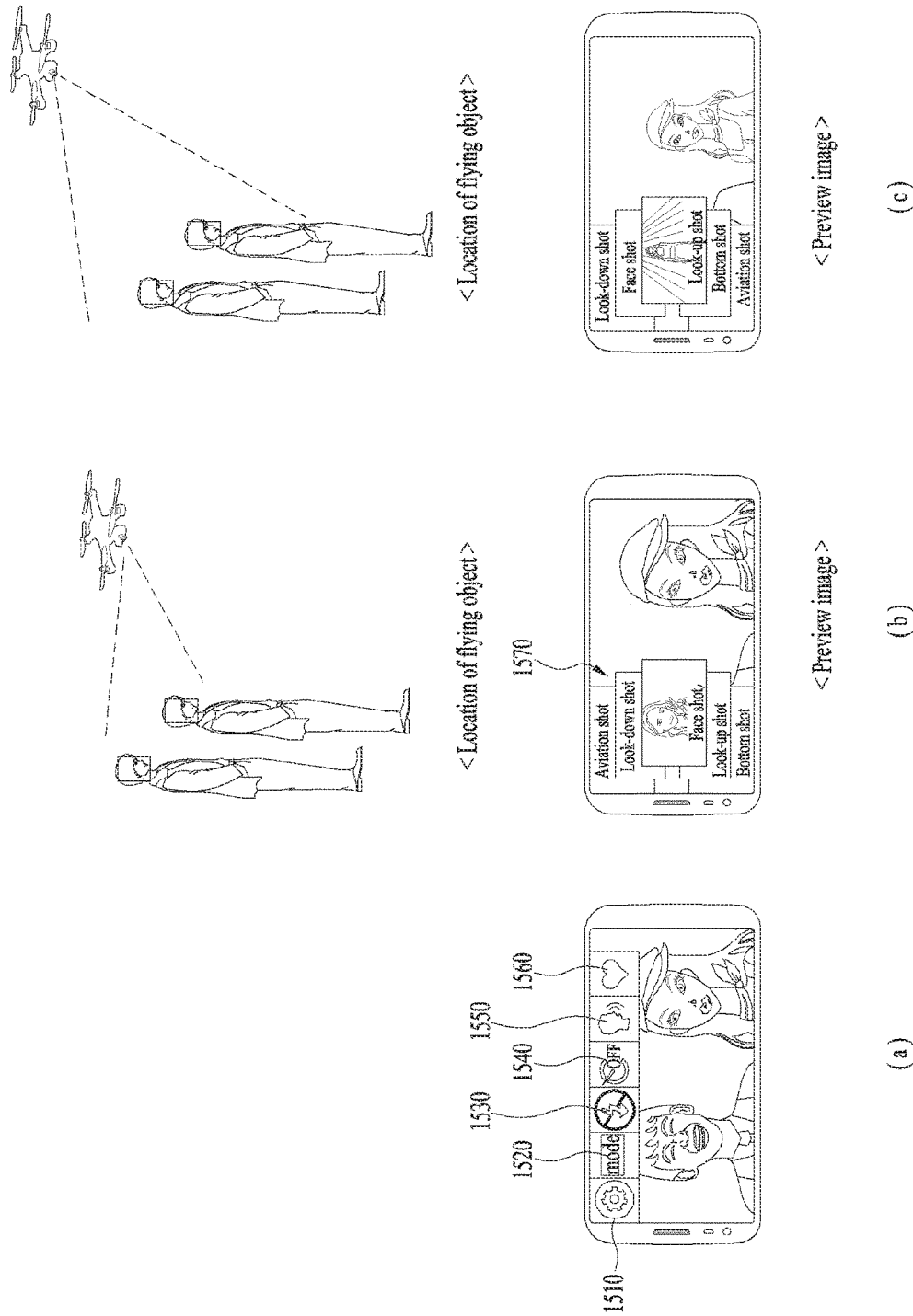
FIG. 15 is a diagram for one example of selecting a shot mode by user manipulation.

For instance, FIG. 15 is a diagram for one example of selecting a shot mode by user manipulation.

Referring to FIG. 15, if a setting button provided through a control application is touched, the controller 180 can output menus for adjusting a shot mode and camera settings. According to the example shown in FIG. 15 (a), as the setting button 1510 is selected, menus for setting a shot mode 1520, a flash 1530, a timer 1540, a voice shooting 1550, a spaced distance 1560 from a flying object and the like are outputted. If the photo mode 1520 is selected [FIG. 15 (a)], the controller 180 can output a shot mode list 1570 from which a prescribed photo mode can be selected by a user.

If a user input for selecting a prescribed item from the shot mode list 1570 is received [S208], the controller 180 can identifiably display the item selected from the shot mode list 1570 by the user. According to the example shown in FIG. 15 (b), 'face shot mode' corresponding to the shot mode selected by the user is displayed in the middle of the shot mode list 1570.

In order for the user to recognize a composition according to a shot mode, the controller 180 can control a preview image to be outputted in accordance with the shot mode selected by the user [S209].

For example, if a face shot is selected from the shot mode list, the controller 180 can send shot mode information indicating that a face shot mode has been selected and a control signal for moving the flying object 200 to a flight location corresponding to the face shot mode to the flying object 200. If so, the flying object 200 can make a flight in front of the user at the height of the user's eyes approximately. Hence, like the example shown in FIG. 15 (b), the preview image of the taken shot of the user's face can be outputted through the mobile terminal 100.

For another example, if a look-up shot is selected from the shot mode list, the controller 180 can send shot mode information indicating that a look-up shot mode has been selected and a control signal for moving the flying object 200 to a flight location corresponding to the look-up shot mode to the flying object 200. If so, the flying object 200 can make a flight in front of the user at the height higher than that of the user's eyes, whereby the user can look up the flying object 200. Hence, like the example shown in FIG. 15 (c), the preview image showing that the user looking up the flying object 200 can be outputted through the mobile terminal 100.

According to the examples shown in FIG. 15 (b) and FIG. 15 (c), in a look-down shot mode, as the flying object 200 flies in front of the user at a height lower than that of user's eyes, the user can look down the flying object 200. In a bottom shot mode, a shot of the user can be taken above user's head. Moreover, in an aviation shot mode, a shot of the user can be taken at a high location by raising a flight altitude.

If it is difficult to output all the items included in the shot mode list through the display unit 151, the user can select a desired shot mode by scrolling the shot mode list.

If the selection of the shot mode is complete (e.g., a button for indicating that the selection of the shot mode is complete) [S210], the controller 180 can send a notification information indicating that the shot mode selection is complete to the flying object 200. Having received the notification information, the flying object 200 can take a shot [S211].

If a plurality of shot modes is selected from the shot mode list, the flying object 200 can sequentially take shots according to a plurality of the selected shot modes, respectively. For example, if the face shot mode and the look-up shot mode are selected, the flying object 200 takes a shot of the user in the face shot mode and is then able to take a shot of the user again in the look-up mode.

If there are a number of shot modes that can be selected by the user, it may be efficient to search for a desired shot mode by sorting the shot modes by categories. Hence, after a higher category list has been displayed, if a prescribed category is selected from the higher category list, the controller 180 can control a shot mode list corresponding to the selected category to be outputted.

For instance, FIG. 16 is a diagram for one example of selecting a shot mode in accordance with a category.

Referring to FIG. 16, if a user input for selecting a shot mode is received, the controller 180 can control a higher category list 1610 to be outputted [FIG. 16 (a)]. According to the example shown in FIG. 16 (a), the higher category list 1610 including a face category 1620, a full body category 1630 and a scenery category 1640 is outputted. In particular, the face category 1620 may indicate the shot modes for taking a shot centering on a face. The full body category 1630 may indicate the shot modes for taking a shot of a user's full body. And, the scenery category 1640 may indicate the shot modes for taking a shot of a person together with scenery.

If a prescribed category is selected from the higher category list, the controller 180 can control a shot mode list corresponding to the selected category to be outputted. According to the example shown in FIG. 16 (b), as a face category is selected, a left selfie mode 1622, a right selfie mode 1624 and a front selfie mode 1626, which are categorized into the face category, are outputted.

If a prescribed shot mode is selected from the shot modes, the controller 180 can send shot mode information indicating the selected shot mode or a control signal for moving the flying object 200 to a flight location corresponding to the selected shot mode to the flying object 200. Having received the shot mode information or the control signal, the flying object 200 can move to the flight location corresponding to the selected shot mode. According to the example shown in FIG. 16 (b), if the left selfie mode is selected, the flying object 200 can move to a location for taking a left side of a user's face. Hence, a preview image corresponding to the selected shot mode can be outputted through the mobile terminal 100.

If the selection of the shot mode is complete (e.g., a button indicating that the selection of the shot mode is complete is touched), the controller 180 can send the flying object 200 notification information indicating that the shot mode selection is complete. Having received the notification information, the flying object 200 can take a shot. If a plurality of shot modes is selected from the shot mode list, the flying object 200 can sequentially take shots according to a plurality of the selected shot modes, respectively.

The controller 180 may set up a shot mode in accordance with a previously taken photo. In particular, if the previously taken photo is selected, the controller 180 can remotely control the flying object 200 to create the same composition of the previously taken photo.

For instance, FIG. 17 is a diagram for one example of setting a shot mode in accordance with a preset photo.

Referring to FIG. 17, if a user input for selecting a shot mode is received, like the example shown in FIG. 17 (*a*), the controller 180 can control a higher category list to be outputted. According to the example shown in FIG. 17 (*a*), the higher category list 1710 including a face category 1720, a full body category 1730 and a scenery category 1740 is outputted. In particular, the face category 1720 may indicate the photos taken centering on a face. The full body category 1730 may indicate the photos of taking a full body. And, the scenery category 1740 may indicate the photos of taking a shot of a person together with scenery.

If a prescribed category is selected from the higher category list, the controller 180 can control the photos corresponding to the selected category to be outputted. According to the example shown in FIG. 17 (*b*), as the face category 1720 is selected, the photo 1722 of taking the user's face from the left, the photo 1724 of taking the user's face from the right, the photo 1726 of taking the user's face from the front and the like are outputted.

If a prescribed photo is selected from the previously taken photos, the flying object 200 can move to the flight location for taking a photo under the same composition of the selected photo. According to the example shown in FIG. 17 (*b*), if the photo 1722 of taking the shot of the user's face from the left is touched, the flying object 200 can move to a location for taking a left side of the user's face. Hence, a preview image in the same composition of the selected photo can be outputted through the mobile terminal 100.

If the selection of the photo is complete (e.g., a button indicating that the selection of the photo is complete is touched), the controller 180 can send the flying object 200 notification information indicating that the photo selection is complete. Having received the notification information, the flying object 200 can take a shot. If a plurality of the photos is selected, the flying object 200 can sequentially take shots based on a plurality of the selected photos, respectively. For instance, if the photo of taking the shot of the user's face from the left and the photo of taking the shot of the user's face from the right are selected, the flying object 200 takes the shot of the user's face from the left and is then able to take the shot of the user's face again from the right by moving its flight location.

According to the examples shown in FIG. 16 and FIG. 17, the shot mode of the flying object 200 can be set through the shot mode list or the previously taken photos. For another example, the controller 180 control a shot mode last used by a user or a set of shot modes set as default to be selected preferentially.

Figure 18:
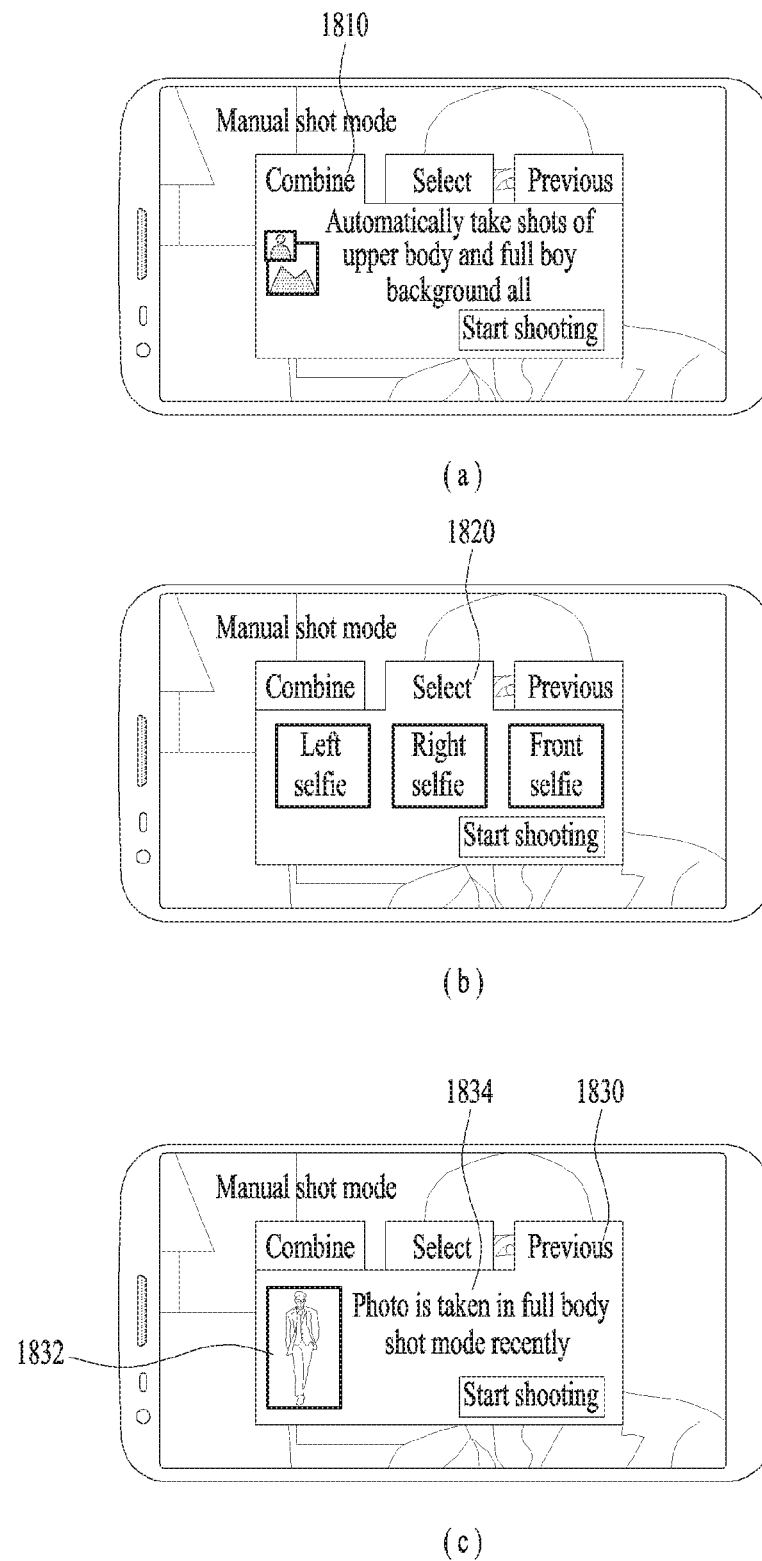
FIG. 18 is a diagram for another example of setting a shot mode.

For instance, FIG. 18 is a diagram for another example of setting a shot mode.

Referring to FIG. 18 (*a*), if a user input for selecting a shot mode is received, the controller 180 can control a menu for setting a shot mode to be outputted.

According to the example shown in FIG. 18 (*a*), the menu for selecting the shot mode includes three kinds of tabs 'Combine' 1810, 'Select' 1820 and 'Previous' 1830.

The combine tab 1810 is provided to take a photo based on a single shot mode set generated from combining various shot modes together. Looking into a message shown in FIG. 18 (*a*), an upper body shot mode, a full body shot mode and a background shot mode are combined together to configure a single set. If a shooting starts based on the single shot mode set, the flying object 200 can take shots sequentially according to the combined shot modes, respectively. For example, if a photo shot button 1812 is touched in FIG. 18 (*a*), the flying object 200 takes a shot of a user's upper body according to the upper body shot mode, takes a shot of a user's full body according to the full body shot mode, and is then able to take a shot of the user with a background according to the background shot mode.

In this case, the shot modes configuring the shot mode set may be set to default or selected based on user's use frequency, recent use order, or the like. The shot modes configuring the shot mode set may be manually selected by the user.

The select tab 1820 may be provided for a user to manually select a shot mode. For instance, if the select tab 1820 is selected, like the example shown in FIG. 18 (*b*), the controller 180 can control a shot mode list, which is provided for a user to select a shot mode, to be outputted. Since the embodiments for outputting the shot mode list have been described with reference to FIGS. 15 to 17 already, the corresponding details shall be omitted from the following description.

The previous tab 1830 is provided to take a photo in the shot mode recently used by a user. If the previous tab 1830 is selected, as shown in FIG. 18 (*c*), the controller 180 can output information indicating the shot mode recently used by the user. According to the example shown in FIG. 18 (*c*), a message indicating a recently used shot mode and a photo taken in the corresponding shot mode are outputted through the display unit 151. Looking into a message shown in FIG. 18 (*c*), it can be observed that the shot mode recently used by the user is a full body shot. If a photo shot button is touched, the flying object 200 can take a shot in the full body shot mode that is the shot mode recently used by the user.

Besides, the controller 180 can control the flying object 200 to take a shot based on a shot mode registered as 'favorites' [not shown in the drawing]. The controller 180 may register a prescribed shot mode as 'favorites' based on a user's selection. Alternatively, the controller 180 may register a prescribed shot mode as 'favorites' in consideration of a user's use frequency.

When the flying object 200 intends to take a shot of a plurality of persons through the camera, if a person to be photographed is not included in a preview image or a person desired not to be photographed is included in the preview image, the controller 180 can control a flight location of the flying object 200 to be changed by remotely controlling the flying object 200.

Figure 19:
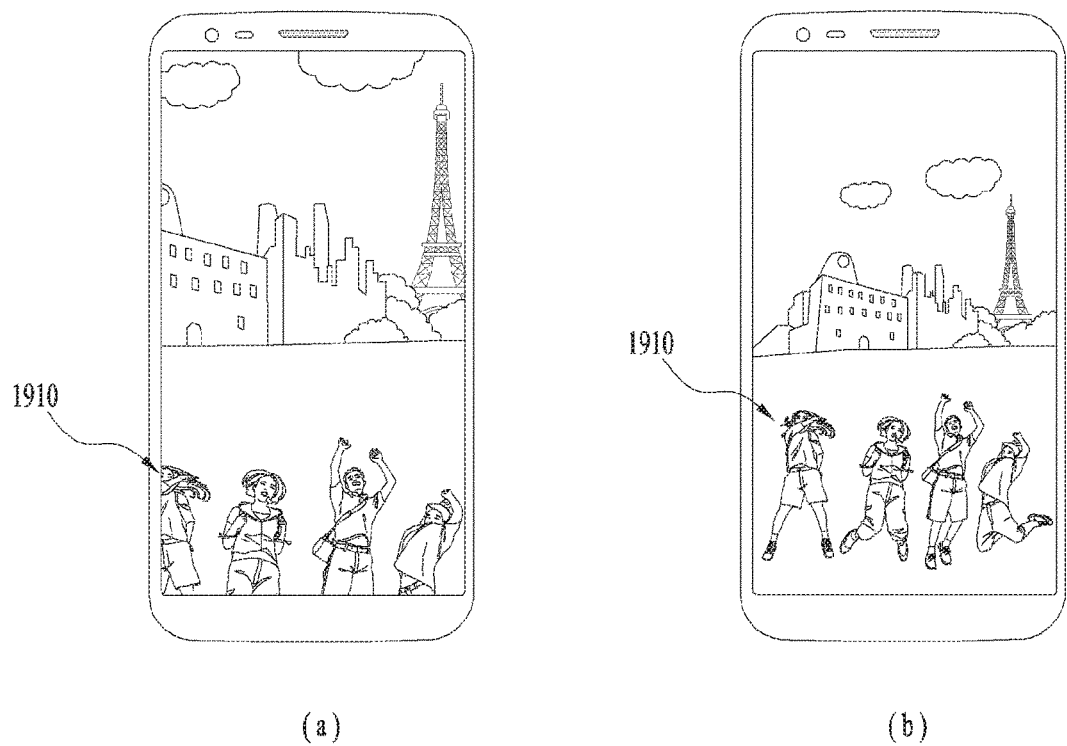

For instance, FIG. 19 and FIG. 20 are diagrams for one example of remotely adjusting a flight location of the flying object 200.

Referring to FIG. 19, when it is intended to take a shot of a specific subject through the camera of the flying object

200, if the subject to be photographed is not fully included in a preview image, the controller 180 can control the flying object 200 to move to a location at which a complete shot of the subject can be taken.

For example, referring to FIG. 19 (*a*), while a portion of a body of a prescribed one of persons to be photographed is included in a preview image but a face of the prescribed person is not included in the preview image, if a touch input of touching the corresponding person (e.g., the body of the corresponding person) 1910 is received, the controller 180 can control the flying object 200 to move to a location at which a shot of the face of the selected person 1910 can be taken.

For example, referring to FIG. 19 (*a*), if a person located on a left side of the preview image is touched, the controller can control a face of the selected person to enter a composition by controlling the flying object 200 to move to the left or farther from the mobile terminal 100.

According to the example shown in FIG. 19 (*b*), as the flight location of the flying object 200 is adjusted, the face of the person touched by the user newly appears in the preview image.

According to the example shown in FIG. 19, as a subject incompletely displayed in the preview image is touched, a flight location of the flying object 200 is adjusted. For another example, the flying object 200 recognizes a subject to photograph additionally through audio inputted through the microphone and may change its flight location to a location at which a shot of the subject can be additionally taken.

For another example, if an unintended subject is included in the preview image, the controller 180 can control the flying object 200 to move to a location at which the corresponding subject can be excluded from the shot.

For instance, referring to FIG. 20, while a preview image including a plurality of persons is outputted, if a user input of touching a prescribed one of the persons included in the preview image is received, the controller 180 can control the flying object 200 to move to a location at which the selected person is not included in the preview image.

For example, if a person 2010 located on a left side of the preview image is touched [FIG. 20 (*a*)], the controller 180 can control the selected person 2101 not to be included in the preview image by controlling the flying object 200 to move to the right or closer to the mobile terminal 100 [FIG. 20 (*b*)].

In case that an unintended subject is included in a preview image, the flying object 200 takes a shot in the first place. Thereafter, if a spatial region having the unintended subject located therein gets blank, the flying object 200 takes a shot again and is then able synthesize the two shots with each other.

Figure 21:
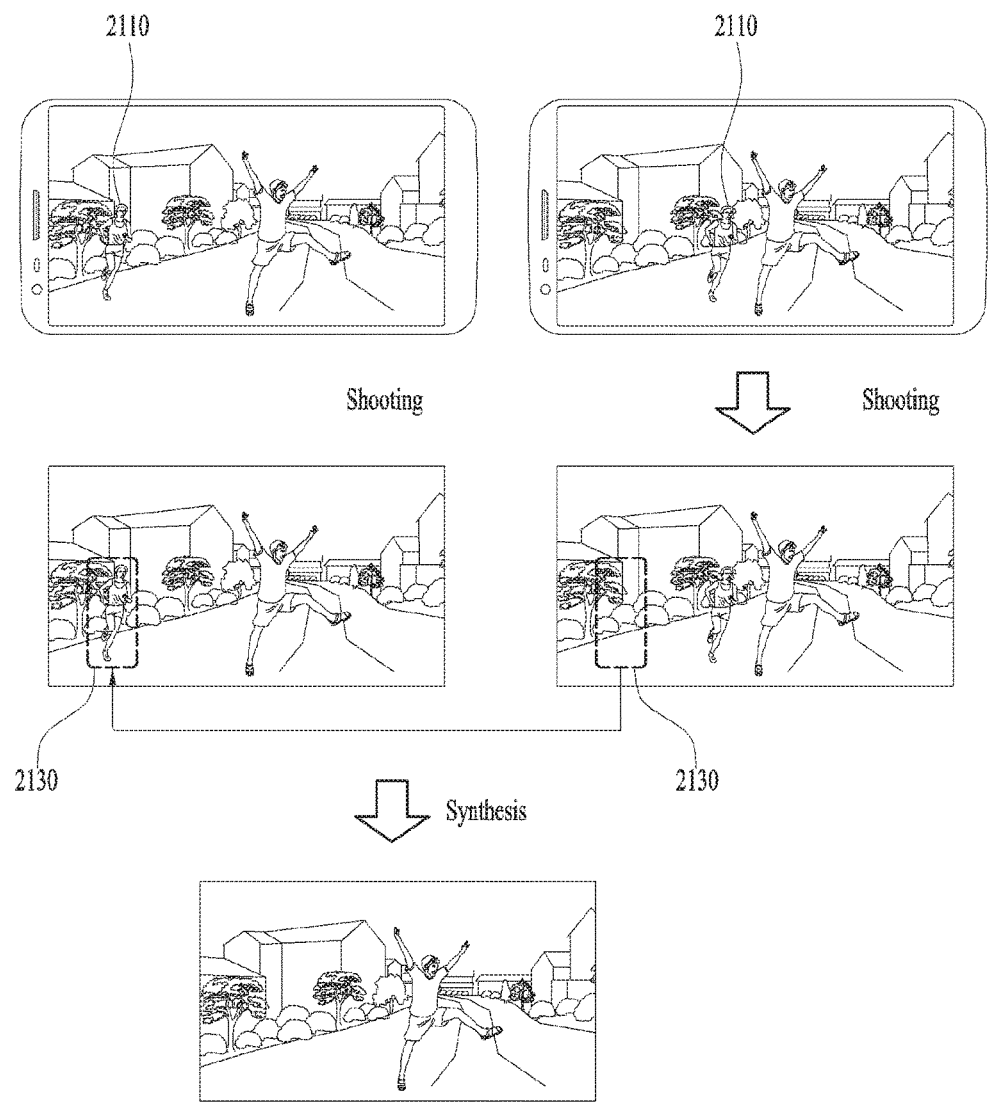
FIG. 21 is a diagram for one example of synthesizing two photos together.

For instance, FIG. 21 is a diagram for one example of synthesizing two photos together.

Referring to FIG. 21, while a preview image including a plurality of persons is outputted, if a user input of touching a prescribed one of the persons included in the preview image is received, the flying object 200 can take a photo at a current location for now. While the flying object 200 is hovering, if a spatial region having the selected person 2110 located therein gets blank, the flying object 200 can take a photo again.

If so, the flying object 200 can synthesize a part 2120 corresponding to a spatial region having a user-selected person located therein in the second taken photo with a spatial region 2130 having the user-selected person 2110 located thereat in the first taken photo. Through this synthesis, the user-selected person can be deleted from the first taken photo.

According to the embodiments mentioned in the foregoing description, once a shot mode is selected, the flying object 200 moves to a flight location according to the selected host mode and is then able to take a shot. On the other hand, although a shot mode is not selected, the flying object 200 cam take a shot based on a remote control of the mobile terminal.

For example, the flying object 200 can adjust a flight location by receiving a control signal from the mobile terminal 100. Thereafter, if the flying object 200 receives a command signal for ordering to take a shot from the mobile terminal 100, the flying object 200 can take a shot.

Figure 22:
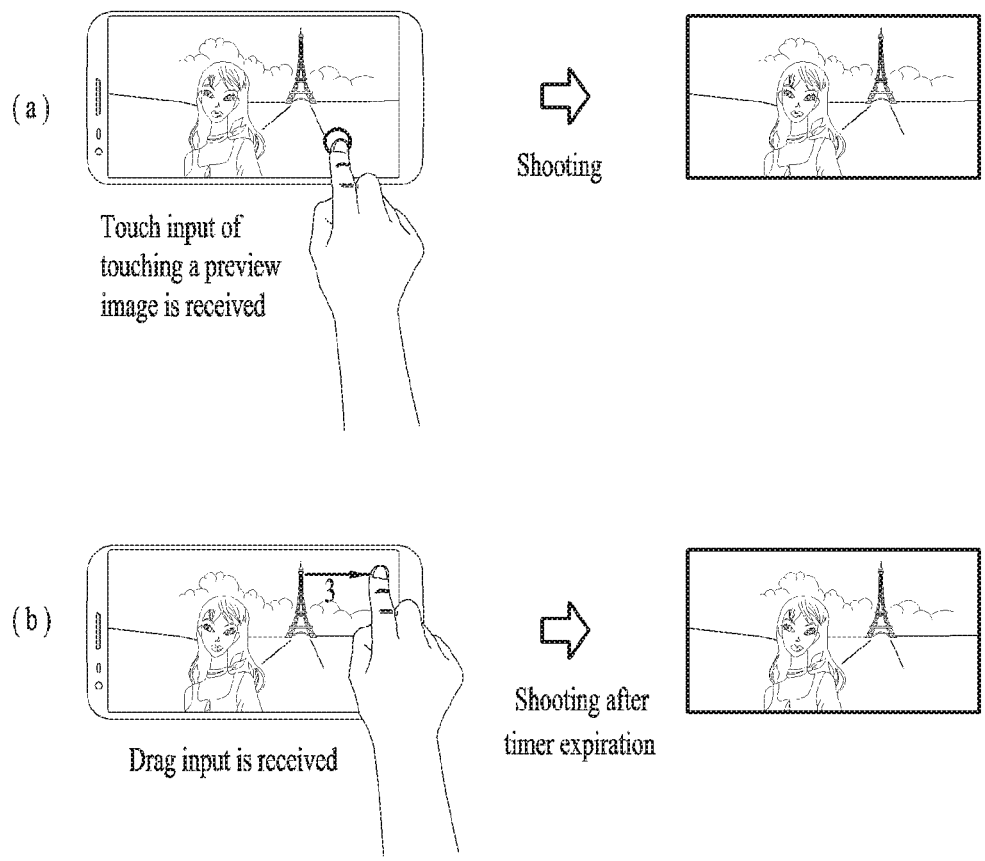
FIG. 22 and FIG. 23 are diagrams of one example for a flying object to take a shot based on a remote control signal of a mobile terminal.
Figure 23:
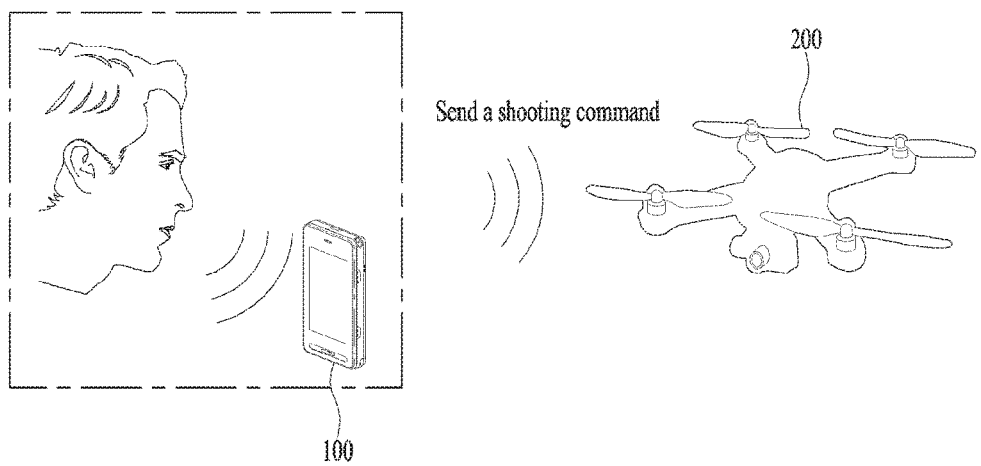

FIG. 22 and FIG. 23 are diagrams of one example for the flying object 200 to take a shot based on a remote control signal of the mobile terminal 100.

As mentioned in the foregoing description, based on user inputs to the manipulating buttons on a control application, the controller 180 can remotely adjust a flight location of the flying object 200. In particular, through the manipulating buttons on the control application, a user can create a desired composition through the camera of the flying object 200.

While a preview image taken by the flying object 200 is displayed, if a user input of touching the preview image or a shot button is received, the controller 180 can send a command signal for ordering to take a shot to the flying object 200. If the command signal for ordering to take a shot is received, the flying object 200 can take a shot. According to the example shown in FIG. 22 (*a*), as a touch input of touching a preview image is inputted, a shot is taken.

If a drag input to the preview image is received, the controller 180 can set a timer in accordance with a length of the drag input. According to the example shown in FIG. 22 (*b*), as a drag input is received, a timer is set for 3 seconds. In doing so, the controller 180 can control the timer set time to increase in proportion to a drag length.

If a touch with a pointer is released from the display unit 151, the controller 180 starts the timer. If the timer expires, the controller can take a shot.

When a mode of the mobile terminal 100 is set to a voice shot mode (e.g., a voice shot button outputted in response to a touch to the setting button shown in FIG. 15 (*a*) is touched), if a user voice matching a preset word (e.g., 'smile', 'kimchi', 'cheese', etc.) is inputted through the microphone, the controller 180 can transmit a command signal for ordering to take a shot to the flying object 200. If the command signal for ordering to take a shot is received, the flying object 200 can take a shot [FIG. 23].

Yet, after the voice has been inputted, in order to give the user enough time to prepare for taking a shot, the flying object 200 may take a shot after the elapse of a prescribed time after the command signal reception.

For another example, in case that a prescribed gesture input is detected from an image inputted through the camera, the flying object 200 may take a shot.

Figure 24:
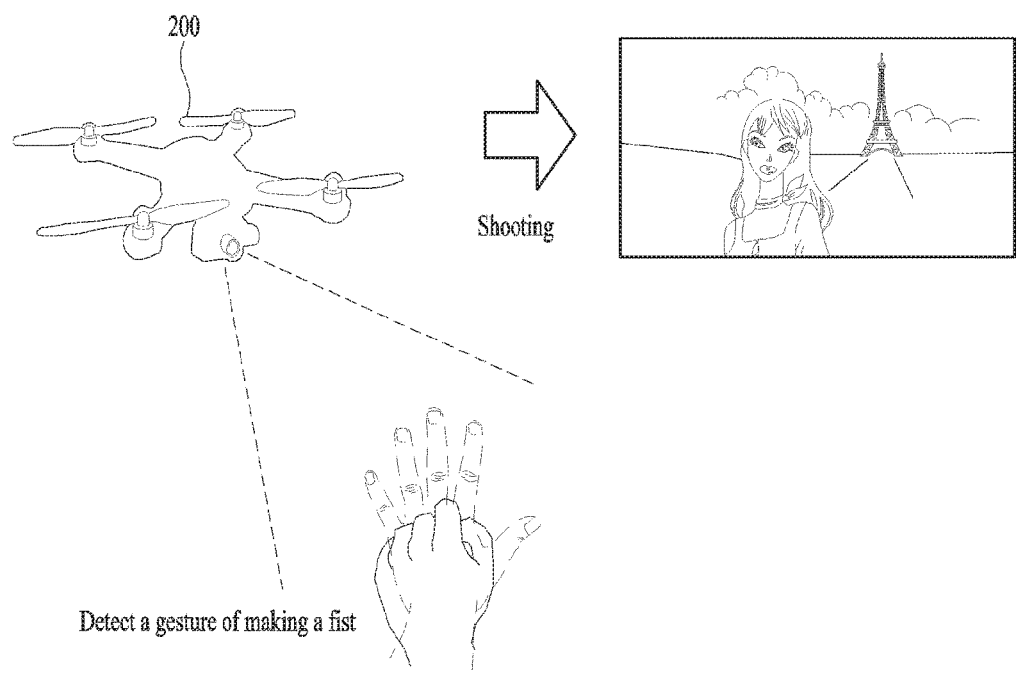
FIG. 24 is a diagram for one example of taking a photo based on a gesture input.

For instance, FIG. 24 is a diagram for one example of taking a photo based on a gesture input.

Referring to FIG. 24, if a user's prescribed gesture input is detected through the camera, the flying object 200 can take a shot in response to the gesture input. For example, if a gesture input of making a first or a gesture of clapping is detected, the flying object 200 take a shot in response to the gesture input. According to the example shown in FIG. 24, as a user input of making a first is detected, a shot is taken.

In doing so, the flying object 200 can take photos repeatedly in accordance with a repetition count of the gesture input.

For example, if a gesture of making a first is repeated three times, the controller 180 can consecutively take photos three times.

Once a photo is taken, the flying object 200 can transmit the taken photo to the mobile terminal 100. If so, the controller 180 can output a preview of the photo taken by the flying object 200. If a user input of touching the preview is received, the controller 180 can output a photo file corresponding to the preview.

For instance, FIG. 25 is a diagram for one example of outputting a taken photo.

Referring to FIG. 25, if the flying object 200 takes a photo, the mobile terminal 100 can receive the photo taken by the flying object 200 from the flying object 200. If the photo is received from the flying object 200, as shown in FIG. 25 (a), the controller 180 can output a preview 2520 of the received photo onto a preview image 2510. In this case, the preview 2520 may include a thumbnail image of the received photo or a reduced image resulting from reducing the received photo into a prescribed size.

If a user input of touching the preview 2520 is received, as shown in FIG. 25 (b), the controller 180 can control a photo file 2530, which corresponds to the preview 2520, to be outputted. According to the example shown in FIG. 25 (b), the photo file 2530 corresponding to the preview 2520 is outputted in a manner of overlaying the preview image 2510.

In doing so, the controller 180 can control the photo file 2530 to be outputted while the touch with a pointer is held on the photo file 2530 only. For example, if the touch to the photo file 2530 with the pointer is released, the controller 180 may control the photo file 2530 to stop being outputted.

The controller 180 can control a delete icon 2540, which is provided to delete the photo file, to be outputted together with the photo file. If the pointer currently touching the display unit 151 is moved to the delete icon and the corresponding touch is then released, the controller 180 may initiate a procedure for deleting the photo file. According to the example shown in FIG. 25 (c), as the touch to the delete icon with the pointer is released, a selection menu 2550 for selecting whether to delete the photo file is outputted.

If a subject intended to be photographed is currently moving, the flying object 200 may take a shot by tracking the subject.

For instance, FIG. 26 is a diagram of one example for a flying object to take shots by tracking a subject.

Referring to FIG. 26, the controller 180 can set up a flight location of the flying object 200. For example, FIG. 26 (a) is a diagram of a user interface for setting a flight location of the flying object 200. According to the example shown in FIG. 26 (a), a location (i.e., a location ①) corresponding to a height of user's eyes in front of a user, a location (i.e., a location ②) higher than a height of user's eyes in front of a user, a location (i.e., a location ③) above a user's head, a location (i.e., a location ④) higher than a height of user's eyes in rear of a user, a location (i.e., a location ⑤) corresponding to a height of user's eyes in rear of a user and the like can be set as the flight locations of the flying object 200.

According to the example shown in FIG. 26 (a), assuming that a flight location for taking a shot of a user at a height higher than that of user's eyes in front of the user is selected, although the user moves, the flying object 200 can continue to fly at a location for taking a shot of a front part of the user at the height higher than that of the user's eyes.

For example, referring to FIG. 26 (b) and FIG. 26 (c), the flying object 200 can continue to fly at the set location by moving in response to a user's movement.

Thereafter, if a person set as a shot target, moves, the flying object 200 is able to move along the person's movement. In particular, although the person moves, the flying object 200 can continue to hold the location for taking an upper body of the person in front of the person.

The flying object 200 may automatically take photos in prescribed time interval by tracking a subject or may take a photo in response to a shooting command given by the mobile terminal 100.

If a selection of a shot mode is cancelled, a shooting according to a selected shot mode is completed, or a landing is instructed by a user input to a landing button for instructing the landing of the flying object 200, the flying object 200 stops flying and is then able to make a landing.

Figure 27:
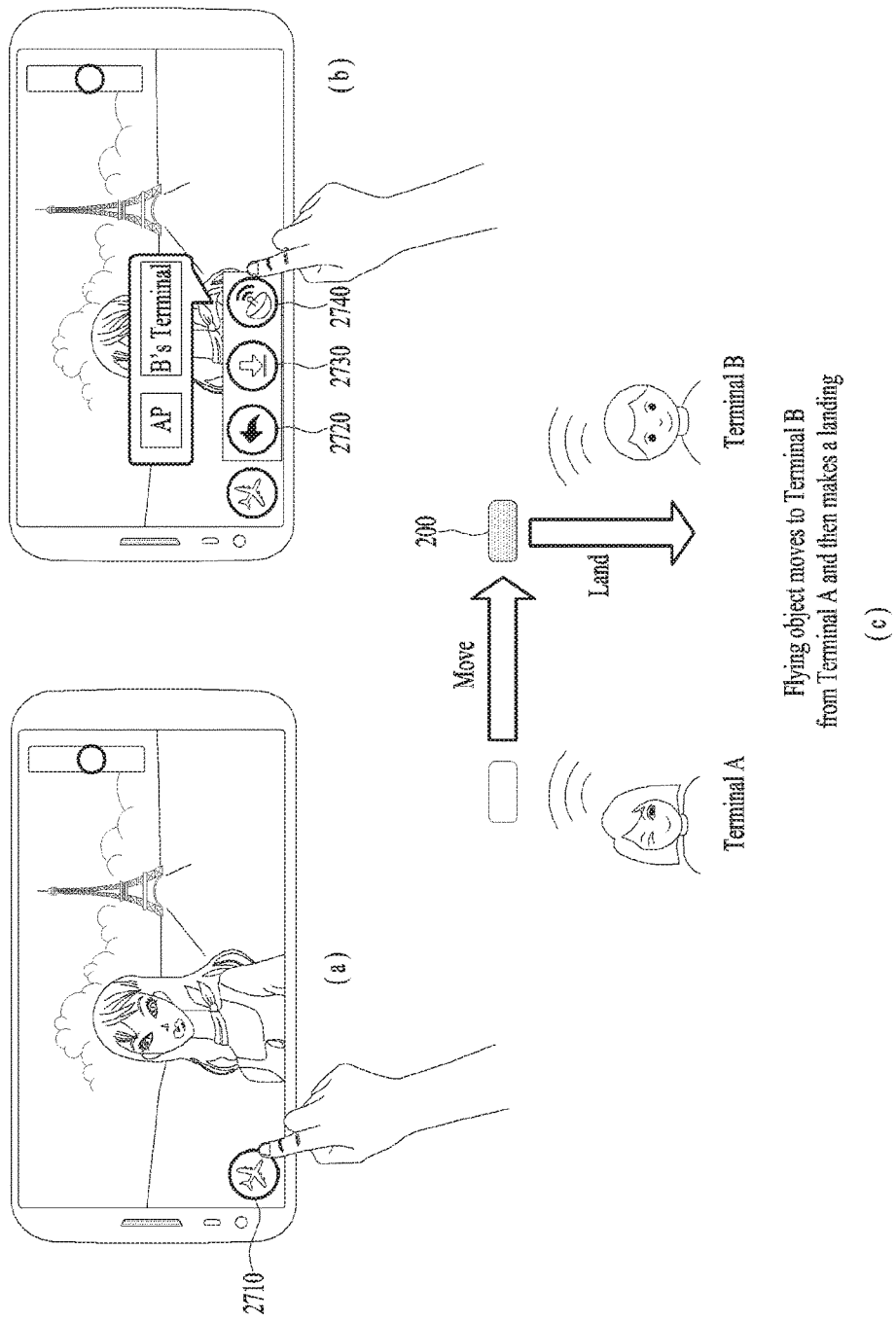
FIG. 27 is a diagram of one example for a flying object to land.

FIG. 27 is a diagram of one example for a flying object to land.

Referring to FIG. 27 (a), if a landing button 2710 on a preview image is touched, the controller 180 can output menus for selecting a landing location of the flying object 200.

According to the example shown in FIG. 27 (a), a return button 2720 may indicate the button for instructing the flying object 200 to make a landing after approaching the mobile terminal 100. And, a current location button 2730 may indicate the button for instructing the flying object 200 to make a landing at a current flight location.

A 'move to a specific signal' button 2740 may indicate the button for instructing the flying object 200 to make a landing after moving to an area around such a device capable of communicating with the flying object 200 as an AP, a different mobile terminal 100, or the like. For example, while the flying object 200 is paired with a terminal A, if the flying object 200 is instructed to move to a terminal B [FIG. 27 (b)], the flying object 200 moves to an area around the terminal B and is then able to make a landing [FIG. 27 (c)]. In doing so, the flying object 200 disconnects the pairing with the terminal A and is able to initiate a new pairing with the terminal B.

Meanwhile, while a recommended shot mode list or a shot mode list is outputted, if a user input for canceling a selection of a shot mode is received or a shooting according to the selected shot mode is completed, the controller 180 can transmit a command signal for instructing the flying object 200 to make a landing by stopping the flight.

Figure 28:
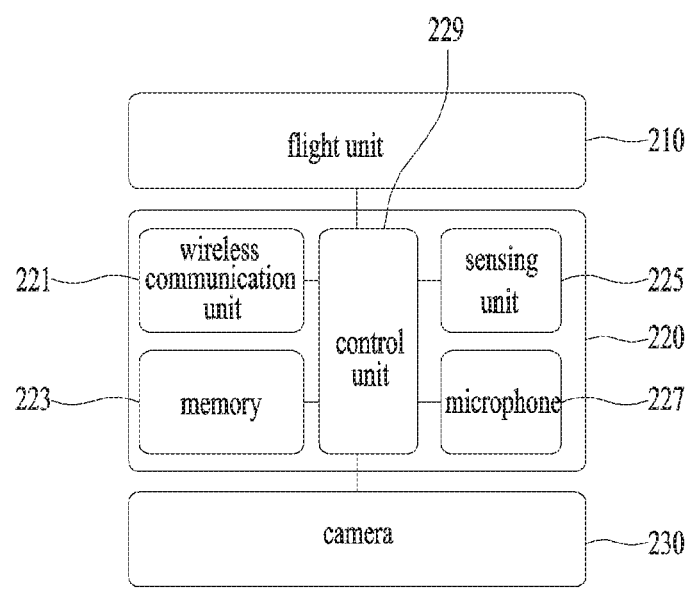
FIG. 28 is a block diagram of a flying object according to the present disclosure.

FIG. 28 is a block diagram of the flying object 200 according to the present disclosure.

Referring to FIG. 28, a flying object may include a flight unit 210, a body unit 220 and a camera 230 in an exterior view.

The flight unit 210 generates lift to enable the flying object 200 to make a flight. The flight unit 210 may include at least one propeller that can be rotated by being connected to a motor.

Various electronic parts configuring the flying object 200 can be loaded on the body unit 220.

For example, the body unit 220 may include a wireless communication unit 221, a memory 223, a sensing unit 225, a microphone 227, a control unit 229 and the like.

The wireless communication unit 221 performs a wireless communication between the flying object 200 and the mobile terminal 100. For example, the wireless communication unit 221 can communicate with the mobile terminal 100 using such a communication technology as Bluetooth, Zigbee, Wi-Fi or the like or such a mobile communication technology as LET, HSPDA or the like. Besides, the wireless communication 221 may be used to receive location information of a flying object.

The memory 223 plays a role in storing data of a shot image or data received from the mobile terminal 100.

The sensing unit 225 plays a role in detecting a state of the flying object 200 and a surrounding environment. For example, the sensing unit 225 detects a nearby object, thereby preventing the flying object 200 from colliding with another object while flying. Moreover, based on a sensing signal of the sensing unit 225, the control unit 229 can determine whether a shooting place is an indoor place or not.

The microphone 227 plays a role in inputting a user voice. Based on the voice inputted through the microphone 227, the control unit 229 may select a shot target.

The control unit 229 plays a role in controlling the flying object 200 overall. In particular, the control unit 229 can adjust a flight location of the flying object 200 and a rotation angle of the camera 230 in response to information received from the mobile terminal 100 or a gesture input detected through the camera 230.

Besides, based on information received from the mobile terminal 100 or a gesture input detected through the camera 230, the control unit 229 can control the camera 230 so that a photo can be taken.

The camera 230 is exposed through an outer surface of the flying object 200 to play a role in shooting a video or photo. If a photo is taken through the camera 230, the control unit 229 can send the taken photo to the mobile terminal 100. As mentioned in the foregoing description, the camera 230 of the flying object 200 can be installed in a manner of being tilted up, down, right and left.

A mirror may be attached next to a camera lens. Hence, a user may recognize a spatial region, which is to be shot through the camera, through an image formed on the mirror.

Accordingly, embodiments of the present disclosure provide various effects and/or features.

According to at least one of embodiments of the present disclosure, a mobile terminal and controlling method thereof are provided, thereby enhancing user's convenience.

According to at least one of embodiments of the present disclosure, a mobile terminal and controlling method thereof are provided, thereby remotely controlling a flying object equipped with a camera.

According to at least one of embodiments of the present disclosure, a mobile terminal and controlling method thereof are provided, thereby remotely controlling a flight location of a flying object in accordance with a shot mode.

It will be appreciated by those skilled in the art that the present disclosure can be specified into other form(s) without departing from the spirit or scope of the disclosures.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A mobile terminal, comprising:
    a wireless communication unit configured to perform a communication with a flying object;
    a touchscreen; and
    a controller operably coupled with the wireless communication unit and the touchscreen and configured to:
        cause the touchscreen to display a preview image received from the flying object, wherein the preview image is received via a camera of the flying object;
        cause the touchscreen to display a shot mode list on the preview image;
        remotely control a flight location of the flying object according to a shot mode selected from the shot mode list; and
        cause change of the flight location of the flying object in response to a user input for selecting a subject included in the preview image such that the selected subject is not included in the preview image.

2. The mobile terminal of claim 1, wherein the shot mode list includes a recommended shot mode.

3. The mobile terminal of claim 2, wherein the controller is further configured to select the recommended shot mode based on whether a shooting place is located indoor, number of persons to be photographed, and weather.

4. The mobile terminal of claim 1, wherein the controller is further configured to delete an item included in the shot mode list and dragged from the shot mode list in a first direction.

5. The mobile terminal of claim 1, wherein the controller is further configured to control the flying object to sequentially take shots in accordance with a plurality of the shot modes selected from the shot mode list.

6. The mobile terminal of claim 1, wherein the controller is further configured to cause change of the flight location of the flying object in response to a user input for selecting a subject partially included in the preview image such that the selected subject is completely included in the preview image.

7. The mobile terminal of claim 1, wherein the controller is further configured to:
    control the flying object to take a first picture including a subject located at a first location in the preview image in response to a user input for selecting the subject included in the preview image; and
    control the flying object to take a second picture when the subject is no longer located at the first location.

8. The mobile terminal of claim 7, wherein the controller is further configured to merge the first picture and the second picture by pasting a region corresponding to a second location at which the subject is located in the second picture to a region corresponding to the first location at which the subject is located in the first picture.

9. The mobile terminal of claim 1, wherein the controller is further configured to control the flying object to take a picture in response to a touch input received via the preview image.

10. The mobile terminal of claim 1, wherein the controller is further configured to control the flying object to take a shot after expiration of a set timer in response to a drag input comprising dragging a pointer currently touching the preview image.

11. The mobile terminal of claim 10, wherein the controller is further configured to set an expiry time of the timer in accordance with a dragged length of the dragged pointer.

12. The mobile terminal of claim 1, wherein the controller is further configured to:
cause the flying object to move close to the mobile terminal in response to a user input for zooming in on the preview image; and
cause the flying object to move away from the mobile terminal in response to a user input for zooming out on the preview image.

13. The mobile terminal of claim 1, wherein the controller is further configured to cause the flying object to land nearby a preset communication device.

14. The mobile terminal of claim 13, wherein the controller is further configured to terminate a connection between the flying object and the mobile terminal in response to sensing the flying object nearby the preset communication device.

15. The mobile terminal of claim 1, wherein the controller is further configured to control the flying object to take a picture in accordance with a shot mode applied to previously taken picture in response to selection of the previously taken picture.

16. A flying object, comprising:
a wireless communication unit configured to perform a communication with a mobile terminal;
a motor;
at least one propeller operably coupled with the motor and configured to generate a lift for a flight;
a camera configured to take a shot; and
a controller operably coupled with the wireless communication unit, the motor, and the camera and configured to:
cause the wireless communication unit to transmit a preview image received via the camera to the mobile terminal such that the preview image is displayed on a touchscreen of the mobile terminal;
adjust a flight location in accordance with a shot mode indicated by shot mode information received from the mobile terminal;
control the camera to take a picture in response to formation of a shot composition corresponding to the shot mode; and
change the flight location in response to receiving a user input for selecting a subject included in the preview image such that the selected subject is not included in the preview image.

17. The flying object of claim 16, wherein:
the camera is rotatable; and
the controller is further configured to rotate the camera in response to a user's gesture input detected by the camera.

18. A method for controlling a mobile terminal, comprising:
displaying a preview image received from a flying object on a touchscreen of the mobile terminal, wherein the preview image is received via a camera of the flying object;
displaying a shot mode list on the preview image;
selecting at least one shot mode from the shot mode list;
remotely controlling a flight location of the flying object according to the selected at least one shot mode; and
changing the flight location of the flying object in response to a user input for selecting a subject included in the preview image such that the selected subject is not included in the preview image.

* * * * *